US012806101B2

(12) United States Patent
Matheny et al.

(10) Patent No.: US 12,806,101 B2
(45) Date of Patent: Nov. 24, 2026

(54) PATIENT TRANSPORT APPARATUS WITH AREA LIGHTING MODULE FOR ILLUMINATING STAIRS

(71) Applicant: Stryker Corporation, Kalamazoo, MI (US)

(72) Inventors: Nathan W. Matheny, Portage, MI (US); Cory P. Herbst, Shelbyville, MI (US); Daniel V. Brosnan, Kalamazoo, MI (US); Brian J. Tessmer, Mattawan, MI (US); Joshua Buck, Grand Rapids, MI (US); Isaac A. Schaberg, Kalamazoo, MI (US); John Wallace, Troy, MI (US)

(73) Assignee: Stryker Corporation, Portage, MI (US)

( * ) Notice: Subject to any disclaimer, the term of this patent is extended or adjusted under 35 U.S.C. 154(b) by 212 days.

(21) Appl. No.: 18/571,876

(22) PCT Filed: Jun. 29, 2022

(86) PCT No.: PCT/US2022/035446
§ 371 (c)(1),
(2) Date: Dec. 19, 2023

(87) PCT Pub. No.: WO2023/121715
PCT Pub. Date: Jun. 29, 2023

(65) Prior Publication Data

US 2024/0285457 A1 Aug. 29, 2024

Related U.S. Application Data

(60) Provisional application No. 63/293,137, filed on Dec. 23, 2021.

(51) Int. Cl.
*A61G 7/10* (2006.01)

(52) U.S. Cl.
CPC ......... *A61G 7/1073* (2013.01); *A61G 7/1048* (2013.01); *A61G 7/1059* (2013.01); *A61G 7/1074* (2013.01); *A61G 2203/10* (2013.01)

(58) Field of Classification Search
CPC ...... B62B 5/02; B62D 55/075; A61G 7/1073; A61G 5/00; B60Q 1/247; F21V 33/0068
(Continued)

(56) References Cited

U.S. PATENT DOCUMENTS

| | | | | |
|---|---|---|---|---|
| 6,648,343 B2 | 11/2003 | Way et al. | | |
| 8,640,798 B2 * | 2/2014 | Walkingshaw ........ | A61G 5/066 | 280/5.24 |

(Continued)

FOREIGN PATENT DOCUMENTS

| | | |
|---|---|---|
| CN | 106137579 A | 11/2016 |
| WO | 2014035250 A1 | 3/2014 |

OTHER PUBLICATIONS

Partial International Search Report for Application No. PCT/US2022/035446 dated Oct. 22, 2022, 2 pages.

(Continued)

*Primary Examiner* — Jacob D Knutson
*Assistant Examiner* — Mitchell James Price
(74) *Attorney, Agent, or Firm* — Howard & Howard Attorneys PLLC

(57) ABSTRACT

A patient transport apparatus (100) for transporting a patient along stairs. A seat section (104) is coupled to a support structure (102) supporting a track assembly (154) having a belt. A motor selectively generates torque to drive the belt. An upper area light module (335) is configured to illuminate light directed at floor surfaces in a rearward direction and constrained to a rearward volume to prevent the light from obstructing a view of a user engaging an upper handle assembly (132). A user interface (204) including an activa- (Continued)

tion input control (214) for controlling the motor and an area light input control (334) for controlling the upper area light module (335) is arranged for engagement by the user. A controller (212) is configured to permit operation of the motor based on the activation input control and to operate the upper area light module in a first or second state based on user engagement of the area light input control.

20 Claims, 21 Drawing Sheets

(58) Field of Classification Search
USPC ............................... 180/9.34, 9.32; 280/5.22
See application file for complete search history.

(56) References Cited

U.S. PATENT DOCUMENTS

| | | | | |
|---|---|---|---|---|
| 9,593,833 | B2 * | 3/2017 | McMannon | F21V 33/0068 |
| 2021/0196536 | A1 | 7/2021 | Tessmer et al. | |
| 2021/0196537 | A1 | 7/2021 | Schaberg et al. | |
| 2021/0196539 | A1 | 7/2021 | Wallace et al. | |

OTHER PUBLICATIONS

International Search Report for Application No. PCT/US2022/035446 dated Dec. 5, 2022, 2 pages.

English language abstract and machine-assisted English translation for CN 106137579 A extracted from espacenet.com database on Dec. 19, 2023, 15 pages.

* cited by examiner

100, WC

PATIENT TRANSPORT APPARATUS WITH AREA LIGHTING MODULE FOR ILLUMINATING STAIRS

CROSS-REFERENCE TO RELATED APPLICATIONS

The subject patent application claims priority to, and all the benefits of, U.S. Provisional Patent Application No. 63/293,137, filed on Dec. 23, 2021, the entire contents of which are incorporated by reference herein.

BACKGROUND

In various environments, persons with limited mobility may have difficulty traversing stairs without assistance. In certain emergency situations, traversing stairs may be the only viable option for exiting a building. Here, in order for a caregiver to transport a patient along stairs in a safe and controlled manner, a stair chair or evacuation chair may be utilized to facilitate safe stair traversal. Stair chairs are adapted to transport seated patients either up or down flights of stairs, with two caregivers typically supporting, stabilizing, or otherwise carrying the stair chair with the patient supported thereon.

Certain types of conventional stair chairs utilize powered tracks to facilitate traversing stairs, whereby one of the caregivers manipulates controls for the powered tracks while also supporting the stair chair. With some stair chairs, lighting modules may be utilized to emit light around the surrounding area as to assist caregivers in positioning and moving the stair chair through suboptimal lighting conditions, such as may occur while traversing up or down a dark stairway. Here, light emitted from the one or more area light modules may be inadvertently directed in ways that hinder the view of one or more of the caregivers maneuvering the stair chair.

A patient transport apparatus designed to overcome one or more of the aforementioned challenges is desired.

SUMMARY

The present disclosure provides a patient transport apparatus operable by a user for transporting a patient along stairs. The patient transport apparatus includes support structure; a seat section and a back section coupled to the support structure for supporting the patient; a track assembly extending from the support structure and having a belt for traversing stairs; a motor coupled to the track assembly to selectively generate torque to drive the belt; an upper area light module coupled to the back section and configured to illuminate light directed at floor surfaces in a rearward direction and constrained to a rearward volume adjacent to the patient transport apparatus to prevent the light from obstructing a view of a user engaging a pivoting handle assembly; a user interface arranged for engagement by the user and including an activation input control for operating the motor to drive the belt, and an area light input control for controlling operation of the upper area light module; the pivoting handle assembly including first and second hand grip regions arranged to be grasped by the user during movement of the patient transport apparatus; and a controller in communication with the motor, the user interface, and the upper area light module, the controller being configured to permit operation of the motor in response to user engagement of the activation input control and to operate the upper area light module in at least one of a first state and a second state based on user engagement of the area light input control, where the first state is defined by emission of light from the upper area light module and the second state is defined by an absence of light emission from the upper area light module.

The present disclosure also provides a patient transport apparatus operable by a user for transporting a patient along stairs. The patient transport apparatus includes: a support structure; a seat section and a back section coupled to the support structure for supporting the patient; a track assembly extending from the support structure and having a belt for traversing stairs; a motor coupled to the track assembly to selectively generate torque to drive the belt; an area light module including a light, the area light module operable between a first state and a second state different from the first state; a user interface arranged for engagement by the user and including an activation input control for operating the motor to drive the belt, and an area light input control for controlling operation of the area light module; and a controller in communication with the motor, the user interface, and the area light module, the controller being configured to: permit operation of the motor in response to user engagement of the activation input control; operate the area light module in at least one of the first state and the second state based on user engagement of the area light input control; operate between a sleep mode to limit power consumption, and an active mode to facilitate operation of at least one of the motor and the area light module; and simultaneously change operation from the sleep mode to the active mode and operate the area light module in the first state in response to user engagement of the area light input control.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1:
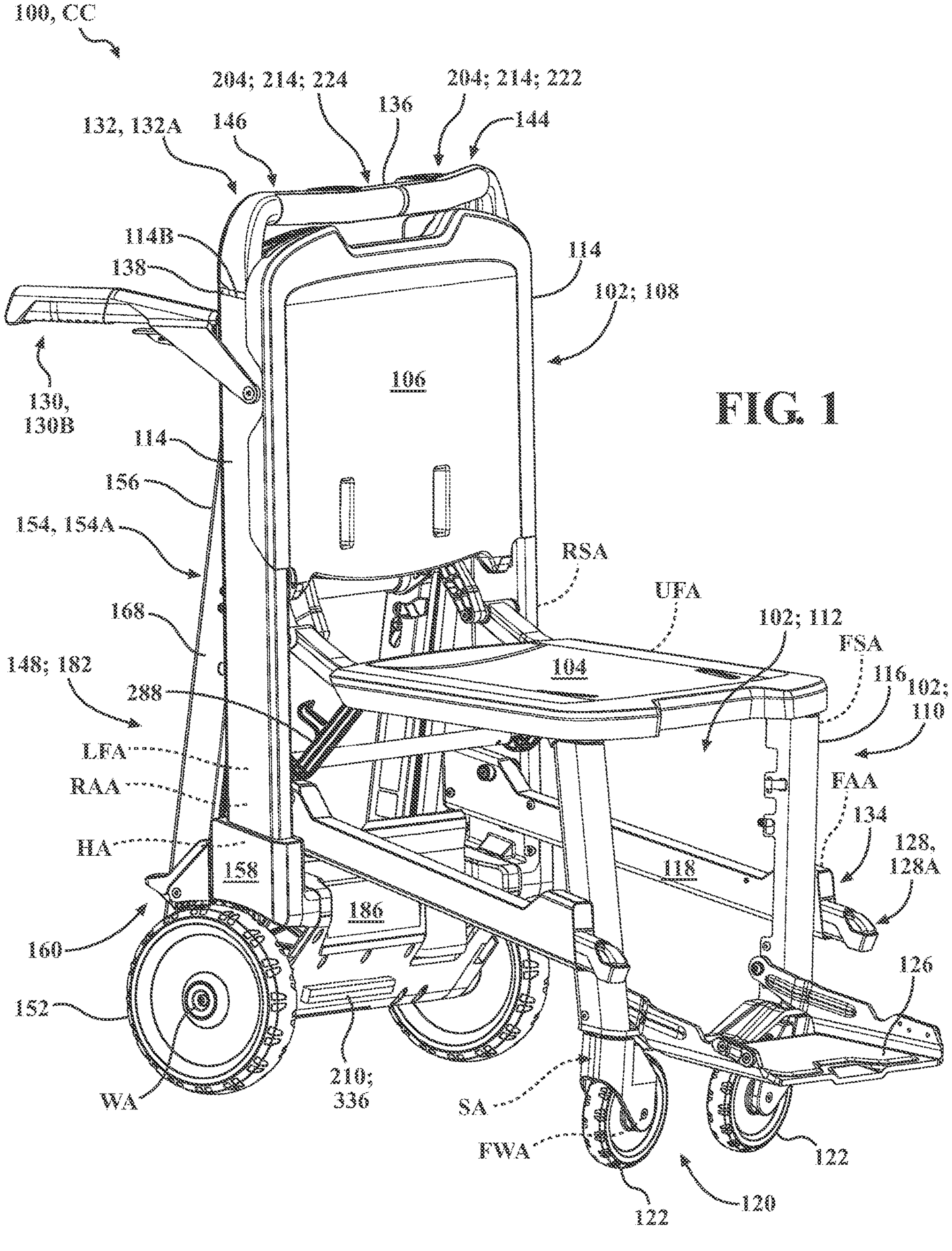
FIG. 1 is a front perspective view of a patient transport apparatus according to the present disclosure, shown arranged in a chair configuration for supporting a patient for transport along a floor surface, and shown having a track assembly disposed in a retracted position, and a handle assembly disposed in a collapsed position, according to the teachings of the present disclosure.

Referring now to the drawings, wherein like numerals indicate like parts throughout the several views, the present disclosure is generally directed toward a patient transport apparatus 100 configured to allow one or more caregivers to transport a patient. To this end, the patient transport apparatus 100 is realized as a "stair chair" which can be operated in a chair configuration CC (see FIG. 1) to transport the patient across ground or floor surfaces FS (e.g., pavement, hallways, and the like), as well as in a stair configuration SC (see FIG. 2) to transport the patient along stairs ST. As will be appreciated from the subsequent description below, the patient transport apparatus 100 of the present disclosure is also configured to be operable in a stowed configuration WC (see FIG. 10) when not being utilized to transport patients (e.g., for storage in an ambulance).

As is best shown in FIG. 1, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112. The back section 106 is coupled to the rear support assembly 108 for concurrent movement. To this end, the rear support assembly 108 comprises rear uprights 114 which extend generally vertically and are secured to the back section 106 such as with fasteners (not shown in detail).

The intermediate support assembly 112 and the seat section 104 are each pivotably coupled to the rear support assembly 108. More specifically, the seat section 104 is arranged so as to pivot about a rear seat axis RSA which extends through the rear uprights 114 (compare FIGS. 5-6A; pivoting about rear seat axis RSA not shown in detail), and the intermediate arms 118 of the intermediate support assembly 112 are arranged so as to pivot about a rear arm axis RAA which is spaced from the rear seat axis RSA and also extends through the rear uprights 114 (compare FIGS. 5-6A; pivoting about rear arm axis RAA not shown in detail). Furthermore, the intermediate support assembly 112 and the seat section 104 are also each pivotably coupled to the front support assembly 110. Here, the seat section 104 pivots about a front seat axis FSA which extends through the front struts 116 (compare FIGS. 5-6A; pivoting about front seat axis FSA not shown in detail), and the intermediate arms 118 pivot about a front arm axis FAA which is spaced from the front seat axis FSA and extends through the front struts 116 (compare FIGS. 5-6A; pivoting about front arm axis FAA not shown in detail). The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 5) and the chair configuration CC (see FIG. 6A). While the seat section 104 is generally configured to remain stationary relative to the support structure 102 when operating in the chair configuration CC or in the stair configuration CC according to the illustrated versions, it is contemplated that the seat section 104 could comprise multiple components which cooperate to facilitate "sliding" movement relative to the seat section 104 under certain operating conditions, such as to position the patient's center of gravity advantageously for transport. Other configurations are contemplated.

Figure 2:
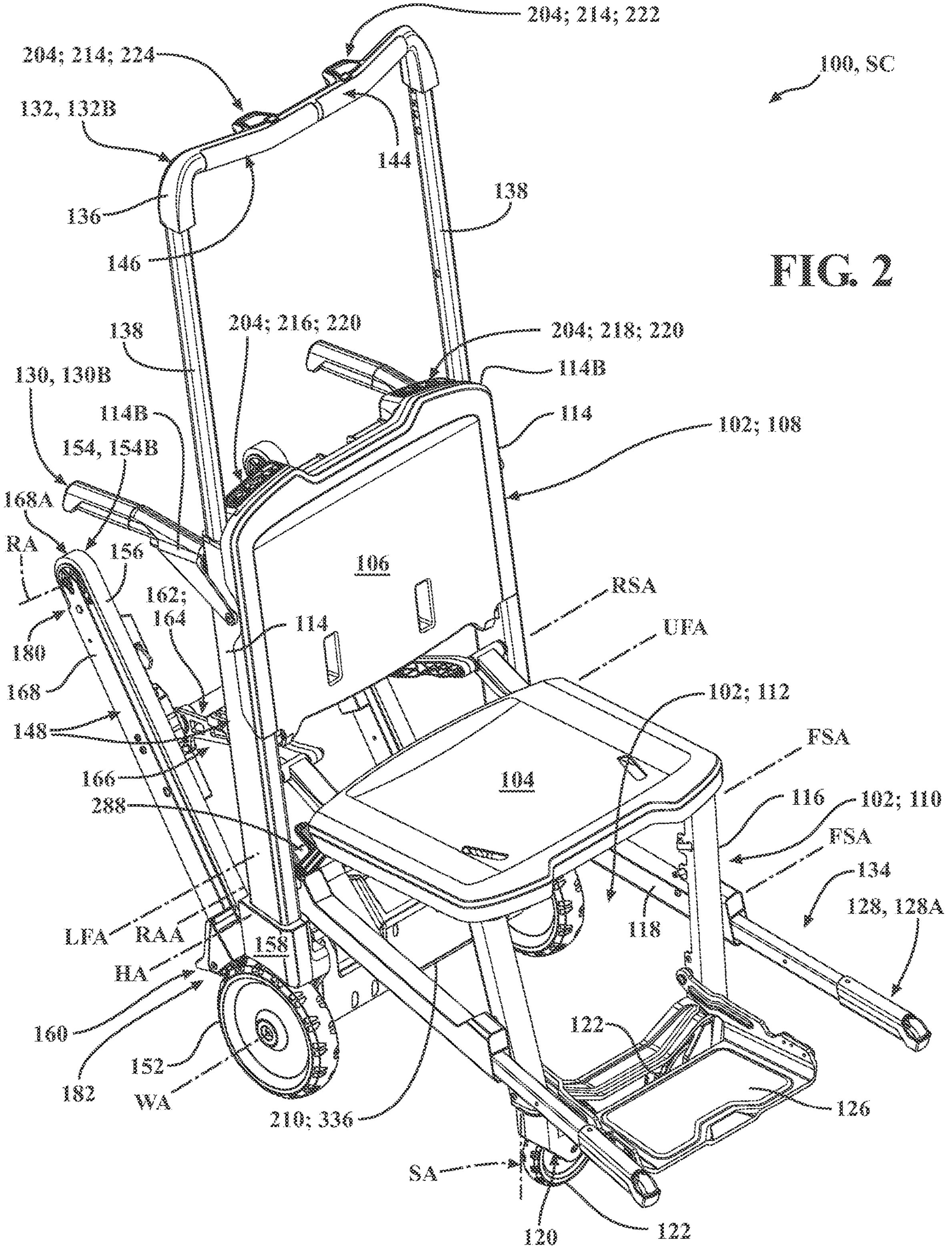
FIG. 2 is another front perspective view of the patient transport apparatus of FIG. 1, shown arranged in a stair configuration for supporting the patient for transport along stairs, and shown with the track assembly disposed in a deployed position, and with the handle assembly disposed in an extended position, according to the teachings of the present disclosure.
Figure 3:
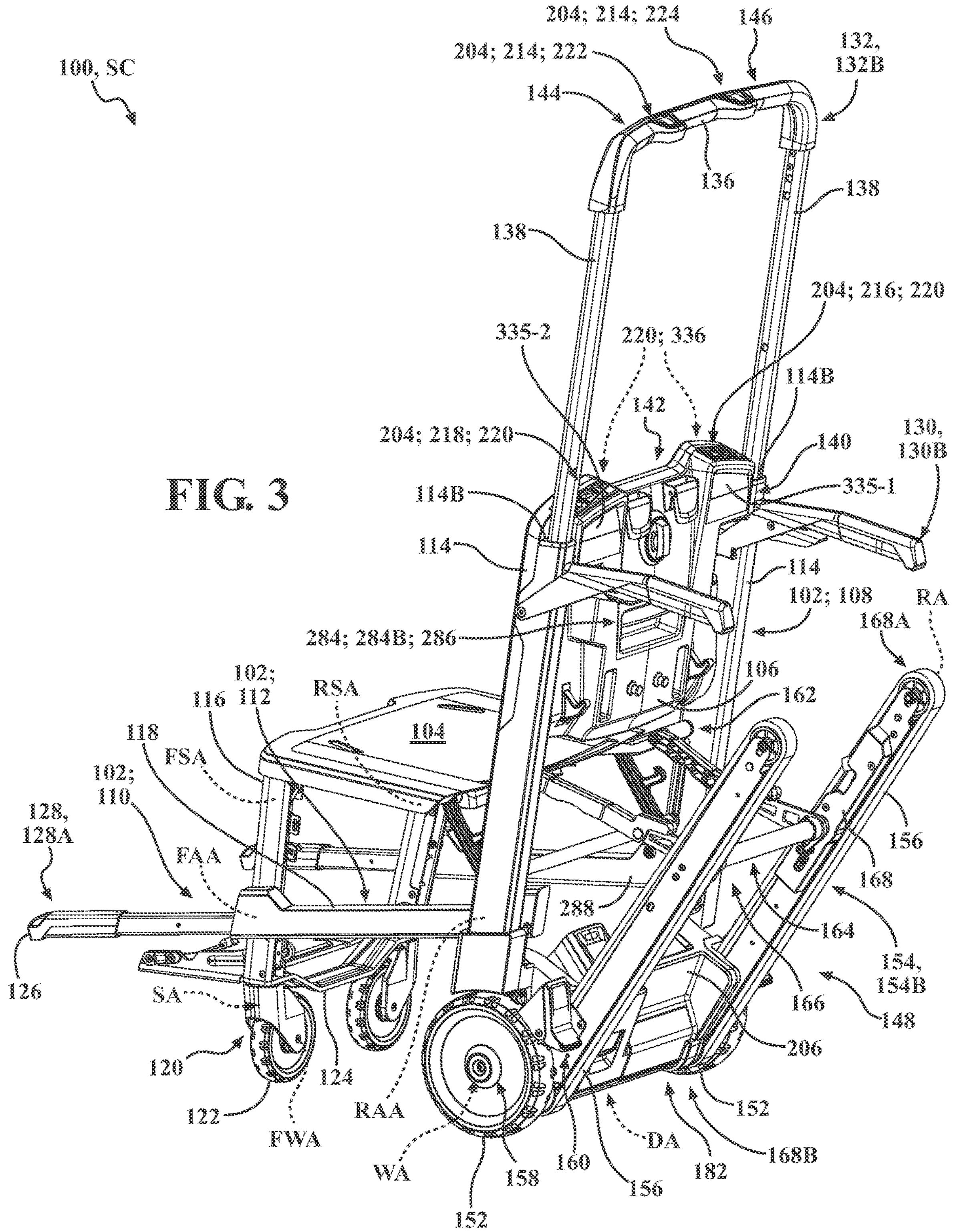
FIG. 3 is a rear perspective view of the patient transport apparatus of FIGS. 1-2, shown arranged in the stair configuration as depicted in FIG. 2, and shown having an extension lock mechanism, a folding lock mechanism, and a deployment lock mechanism, according to the teachings of the present disclosure.
Figure 5:
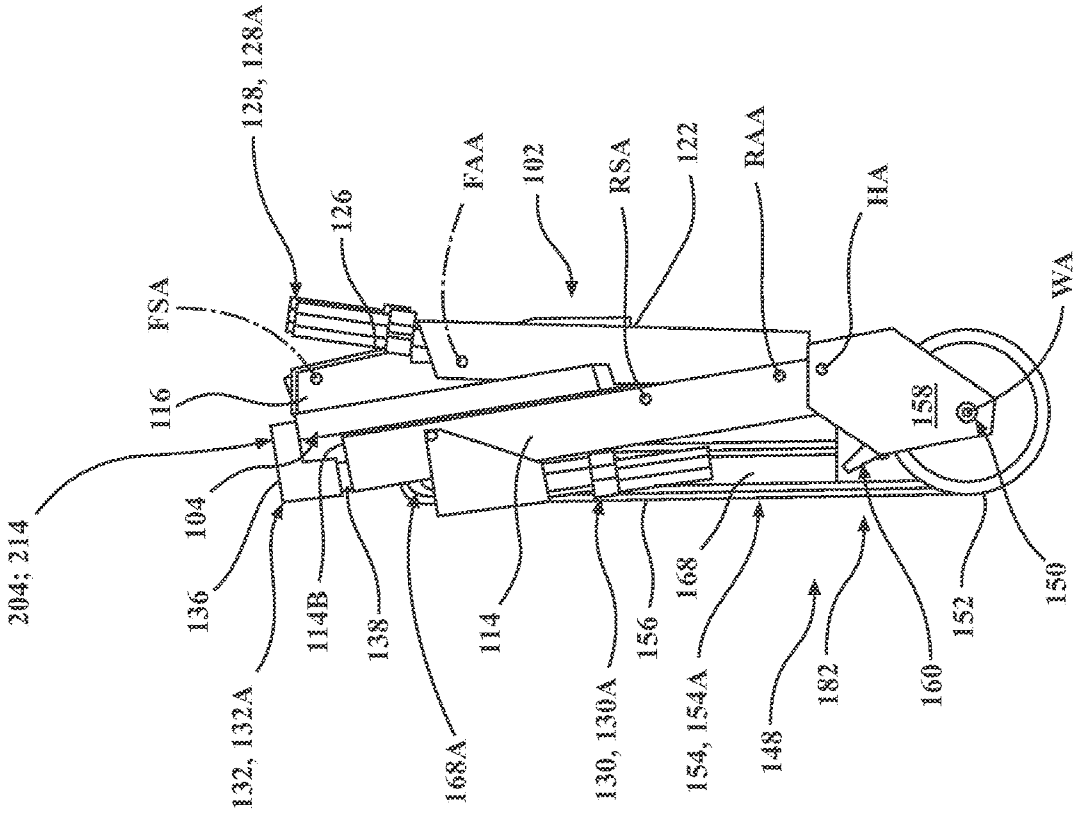
FIG. 5 is a right-side plan view of the patient transport apparatus of FIGS. 1-4, shown arranged in a stowed configuration maintained by the folding lock mechanism, according to the teachings of the present disclosure.
Figure 6A:
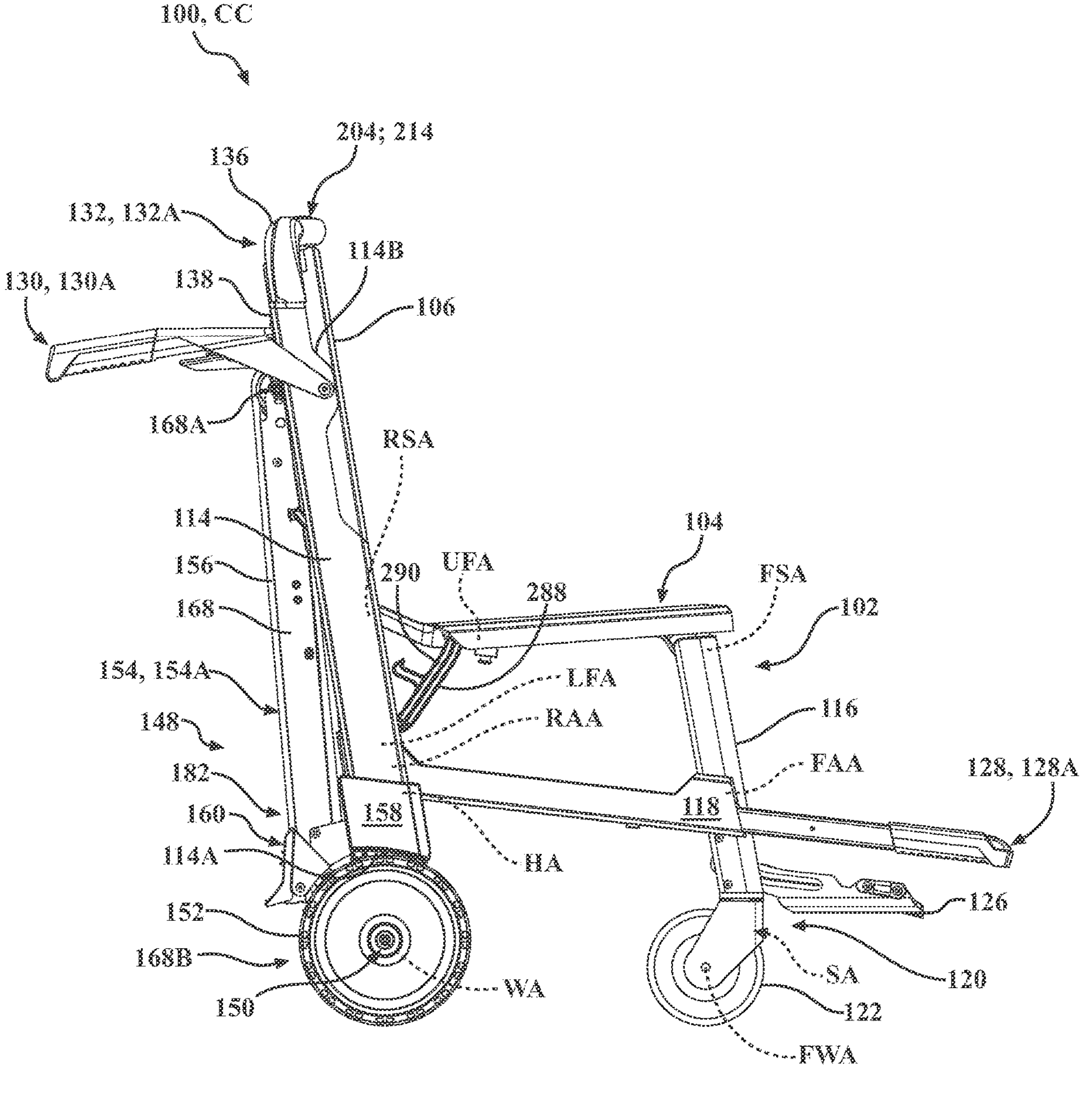
FIG. 6A is another right-side plan view of the patient transport apparatus of FIG. 5, shown arranged in the chair configuration as depicted in FIG. 1, according to the teachings of the present disclosure.

Referring now to FIGS. 1-3, the front support assembly 110 includes a pair of caster assemblies 120 which each comprise a front wheel 122 arranged to rotate about a respective front wheel axis FWA and to pivot about a respective swivel axis SA (compare FIGS. 5-6A; pivoting about swivel axis SA not shown in detail). The caster assemblies 120 are generally arranged on opposing lateral sides of the front support assembly 110 and are operatively attached to the front struts 116. A lateral brace 124 (see FIG. 3) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative versions of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132"), each of which will be described in greater detail below. The front handle assemblies 128 are supported within the respective intermediate arms 118 for movement between a collapsed position 128A (see FIG. 12A) and an extended position 128B (see FIG. 12B). To this end, the front handle assemblies 128 may be slidably supported by bushings, bearings, and the like (not shown) coupled to the intermediate arms 118, and may be lockable in and/or between the collapsed position 128A and the extended position 128B via respective front handle locks 134 (see FIG. 1).

Here, a caregiver may engage the front handle locks 134 (not shown in detail) to facilitate moving the front handle assemblies 128 between the collapsed position 128A and the extended position 128B. The front handle assemblies 128 are generally arranged so as to be engaged by a caregiver during patient transport up or down stairs ST when in the extended position 128B. It will be appreciated that the front handle assemblies 128 could be of various types, styles, and/or configurations suitable to be engaged by caregivers to support the patient transport apparatus 100 for movement. While the illustrated front handle assemblies 128 are arranged for telescoping movement, other configurations are contemplated. By way of non-limiting example, the front handle assemblies 128 could be pivotably coupled to the support structure 102 or other parts of the patient transport apparatus 100. In some versions, the front handle assemblies 128 could be configured similar to as is disclosed in U.S. Pat. No. 6,648,343, the disclosure of which is hereby incorporated by reference in its entirety.

The pivoting handle assemblies 130 are coupled to the respective rear uprights 114 of the rear support assembly 108, and are movable relative to the rear uprights 114 between a stowed position 130A and an engagement position 130B. Like the front handle assemblies 128, the pivoting handle assemblies 130 are generally arranged for engagement by a caregiver during patient transport, and may advantageously be utilized in the engagement position 130B when the patient transport apparatus 100 operates in the chair configuration CC to transport the patient along floor surfaces FS. In some versions, the pivoting handle assemblies 130 could be configured similar to as is disclosed in U.S. Pat. No. 6,648,343, previously incorporated by reference. Other configurations are contemplated.

The handle assembly 132 is also coupled to the rear support assembly 108, and generally comprises an upper grip 136 operatively attached to extension posts 138 which are supported within the respective rear uprights 114 for movement between a collapsed position 132A (see FIG. 1) and an extended position 132B (see FIG. 2). To this end, the extension posts 138 of the handle assembly 132 may be slidably supported by bushings, bearings, and the like (not shown) coupled to the rear uprights 114, and may be lockable in and/or between the collapsed position 132A and the extended position 132B via an extension lock mechanism 140 with an extension lock release 142 arranged for engagement by the caregiver. As is best shown in FIG. 3, the extension lock release 142 may be realized as a flexible connector which extends generally laterally between the rear uprights 114, and supports a cable connected to extension lock mechanisms 140 which releasably engage the extension posts 138 to maintain the handle assembly 132 in the extended position 132B and the collapsed position 132A (not shown in detail). Here, it will be appreciated that the extension lock mechanism 140 and/or the extension lock release 142 could be of a number of different styles, types, configurations, and the like sufficient to facilitate selectively locking the handle assembly 132 in the extended position 132B. In some versions, the handle assembly 132, the extension lock mechanism 140, and/or the extension lock release 142 could be configured similar to as is disclosed in U.S. Pat. No. 6,648,343, previously incorporated by reference. Other configurations are contemplated.

In the representative version illustrated herein, the upper grip 136 generally comprises a first hand grip region 144 arranged adjacent to one of the extension posts 138, and a second hand grip region 146 arranged adjacent to the other of the extension posts 138, each of which may be engaged by the caregiver to support the patient transport apparatus 100 for movement, such as during patient transport up or down stairs ST (see FIGS. 12A-12F).

As noted above, the patient transport apparatus 100 is configured for use in transporting the patient across floor surfaces FS, such as when operating in the stair configuration SC, and for transporting the patient along stairs ST when operating in the stair configuration SC. To these ends, the illustrated patient transport apparatus 100 includes a carrier assembly 148 arranged for movement relative to the support structure 102 between the chair configuration CC and the stair configuration ST. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC (see FIG. 1) to the stair configuration SC (see FIGS. 2 and 6B) simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

As is described in greater detail below in connection with FIGS. 12A-12F, the movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces to stairs ST as the patient transport apparatus 100 is "tilted" backwards about the rear wheels 152 (compare FIGS. 12D-12F). Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST.

In the representative versions illustrated herein, the carrier assembly 148 comprises hubs 158 that are pivotably coupled to the respective rear uprights 114 for concurrent movement about the hub axis HA. Here, one or more bearings, bushings, shafts, fasteners, and the like (not shown in detail) may be provided to facilitate pivoting motion of the hubs 158 relative to the rear uprights 114. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock 160 coupled to its respective hub 158 to facilitate inhibiting rotation about the wheel axis WA. The wheel locks 160 are generally pivotable relative to the hubs 158, and may be configured in a number of different ways without departing from the scope of the present disclosure. While the representative version of the patient transport apparatus 100 illustrated herein employs hubs 158 with "mirrored" profiles that are coupled to the respective rear uprights 114 and support discrete shafts 150 and wheel locks 160, it will be appreciated that a single hub 158 and/or a single shaft 150 could be employed. Other configurations are contemplated.

Figure 6B:
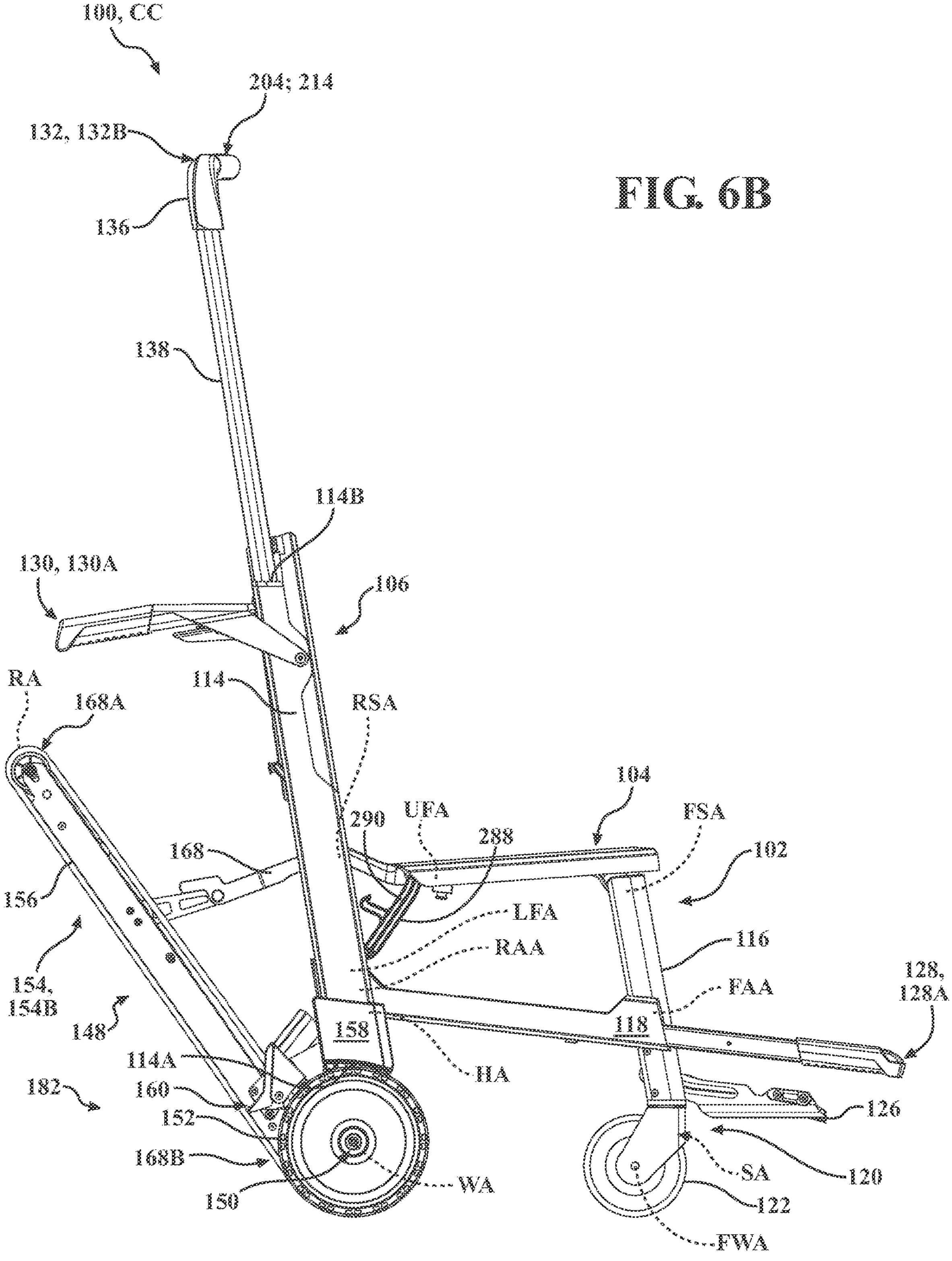
FIG. 6B is another right-side plan view of the patient transport apparatus of FIGS. 5-6A, shown arranged in the stair configuration as depicted in FIGS. 2-3, according to the teachings of the present disclosure.

As is best depicted in FIG. 6B, the rear uprights 114 each generally extend between a lower upright end 114A and an upper upright end 114B, with the hub axis HA arranged adjacent to the lower upright end 114A. The lower upright end 114A is supported for movement within the hub 158, which may comprise a hollow profile or recess defined by multiple hub housing components. The rear uprights 114 may each comprise a generally hollow, extruded profile which supports various components of the patient transport apparatus 100. In the illustrated version, the hub axis HA is arranged generally vertically between the rear arm axis RAA and the wheel axis WA.

Figure 7A:
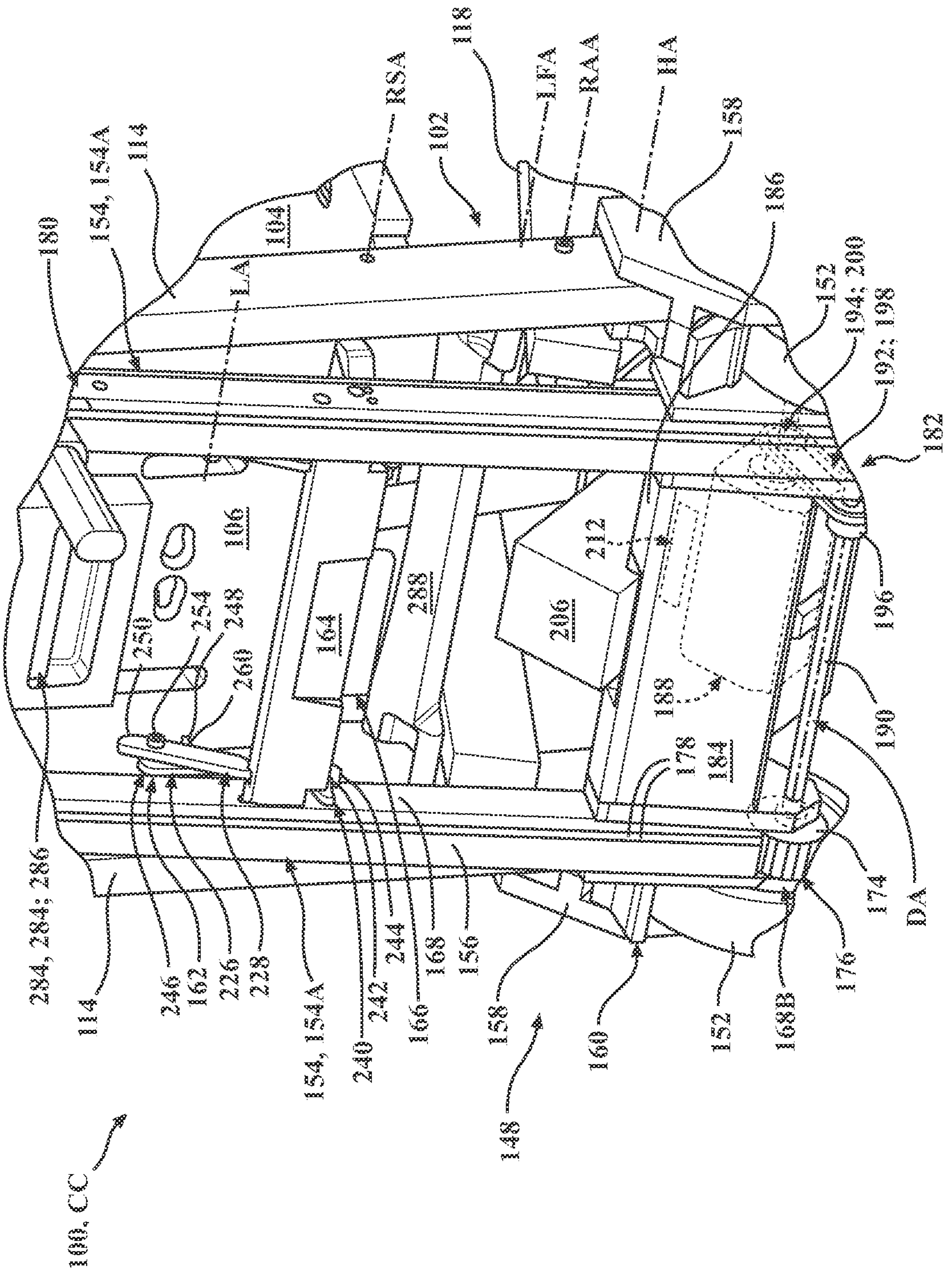
FIG. 7A is a partial rear perspective view of the patient transport apparatus of FIGS. 1-6B, shown arranged in the chair configuration as depicted in FIGS. 1 and 6A, with the deployment lock mechanism shown retaining the track assembly in the retracted position, according to the teachings of the present disclosure.
Figure 7B:
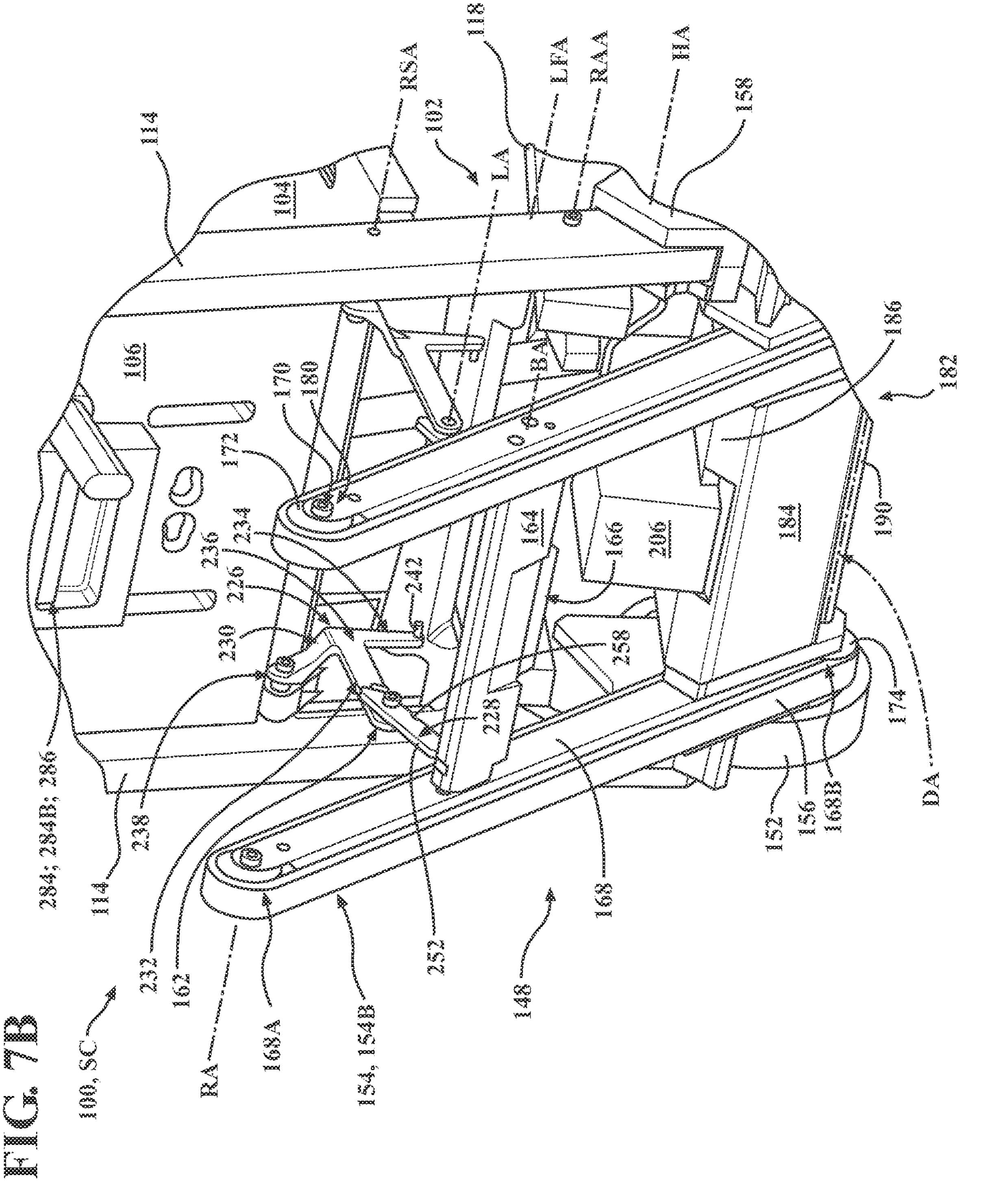
FIG. 7B is another partial rear perspective view of the patient transport apparatus of FIG. 7A, shown arranged in the stair configuration as depicted in FIGS. 2-3 and 6B, with the deployment lock mechanism shown retaining the track assembly in the deployed position, according to the teachings of the present disclosure.

Referring now to FIGS. 7A-7B, as noted above, the track assemblies 154 move concurrently with the hubs 158 between the chair configuration CC and the stair configuration SC. Here, the track assemblies 154 are arranged in a retracted position 154A when the carrier assembly 148 is disposed in the chair configuration CC, and are disposed in a deployed position 154B when the carrier assembly 148 is disposed in the stair configuration SC. As is described in greater detail below, the illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B (and, thus, between the chair configuration CC and the stair configuration SC).

In the illustrated version, the patient transport apparatus 100 comprises laterally-spaced track assemblies 154 each having a single belt 156 arranged to contact stairs ST. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle 170 defining a roller axis RA is disposed adjacent to the first rail end 168A of each rail 168, and a roller 172 is supported for rotation about the roller axis RA. For each of the track assemblies 154, the belt 156 is disposed in engagement with the roller 172 and is arranged for movement relative to the rail 168 in response to rotation of the roller 172 about the roller axis RA.

Adjacent to the second rail end 168B of each rail 168, a drive pulley 174 is supported for rotation about a drive axis DA and is likewise disposed in engagement with the belt 156 (see FIGS. 7A-7B; rotation about drive axis DA not shown in detail). Here, the drive pulley 174 comprises outer teeth 176 which are disposed in engagement with inner teeth 178 formed on the belt 156. The track assemblies 154 each also comprise a belt tensioner, generally indicated at 180, configured to adjust tension in the belt 156 between the roller 172 and the drive pulley 174.

In the representative version illustrated herein, the patient transport apparatus 100 comprises a drive system, generally indicated at 182, configured to facilitate driving the belts 156 of the track assemblies 154 relative to the rails 168 to facilitate movement of the patient transport apparatus 100 up and down stairs ST. To this end, and as is depicted in FIG. 7A, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor 188 (depicted in phantom in FIG. 7A) is coupled to the drive frame 184 and is concealed by the cover 186. The motor 188 is configured to selectively generate rotational torque used to drive the belts 156 via the drive pulleys 174, as described in greater detail below. To this end, a drive axle 190 is coupled to each of the drive pulleys 174 and extends along the drive axis DA laterally between the track assemblies 154. The drive axle 190 is rotatably supported by the drive frame 184, such as by one or more bearings, bushings, and the like (not shown in detail). A geartrain 192 is disposed in rotational communication between the motor 188 and the drive axle 190. To this end, in the version depicted in FIG. 7A, the geartrain 192 comprises a first sprocket 194, a second sprocket 196, and an endless chain 198. Here, the motor 188 comprises an output shaft 200 to which the first sprocket 194 is coupled, and the second sprocket 196 is coupled to the drive axle 190. The endless chain 198, in turn, is supported about the first sprocket 194 and the second sprocket 196 such that the drive axle 190 and the output shaft 200 rotate concurrently. The geartrain 192 may be configured so as to adjust the rotational speed and/or torque of the drive axle 190 relative to the output shaft 200 of the motor, such as by employing differently-configured first and second sprockets 194, 196 (e.g., different diameters, different numbers of teeth, and the like).

While the representative version of the drive system 182 illustrated herein utilizes a single motor 188 to drive the belts 156 of the track assemblies 154 concurrently using a chain-based geartrain 192, it will be appreciated that other configurations are contemplated. By way of non-limiting example, multiple motors 188 could be employed, such as to facilitate driving the belts 156 of the track assemblies 154 independently. Furthermore, different types of geartrains 192 are contemplated by the present disclosure, including without limitation the geartrains 192 which comprise various arrangements of gears, planetary gearsets, and the like.

Figure 4:
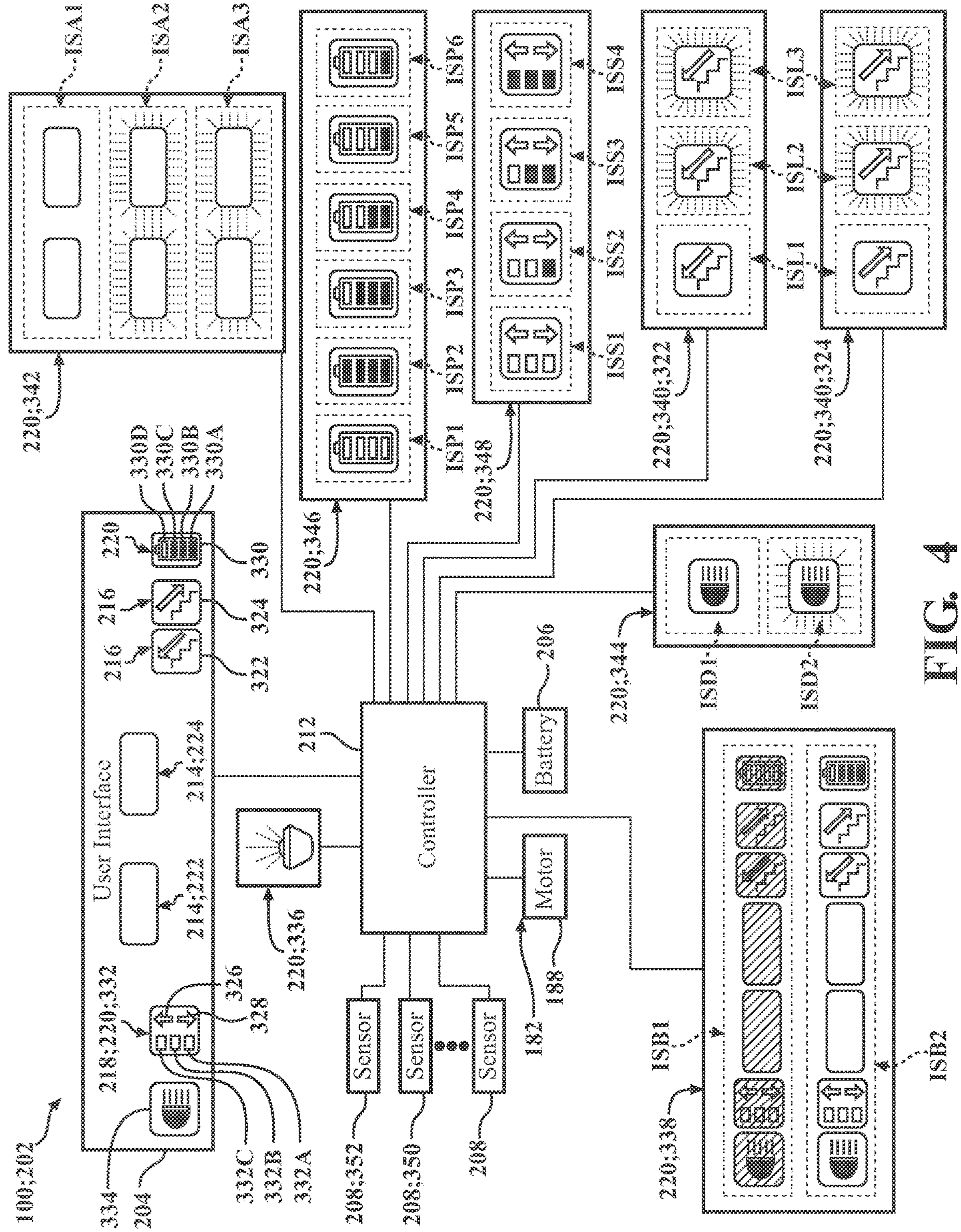
FIG. 4 is a partial schematic view of a control system of the patient transport apparatus of FIGS. 1-3, shown with a controller disposed in communication with a battery, a user interface, a drive system, and a plurality of light modules, according to the teachings of the present disclosure.

The patient transport apparatus 100 comprises a control system 202 to, among other things, facilitate control of the track assemblies 154. To this end, and as is depicted schematically in FIG. 4, the representative version of the control system 202 generally comprises a user interface 204, a battery 206, one or more sensors 208, and one or more back light modules 210 which are disposed in electrical communication with a controller 212. As will be appreciated from the subsequent description below, the controller 212 may be of a number of different types, styles, and/or configurations, and may employ one or more microprocessors for processing instructions or an algorithm stored in memory to control operation of the motor 188, the light modules 210, and the like. Additionally or alternatively, the controller 212 may comprise one or more sub-controllers, microcontrollers, field programmable gate arrays, systems on a chip, discrete circuitry, and/or other suitable hardware, software, and/or firmware that is capable of carrying out the functions described herein.

The controller 212 is coupled to various electrical components of the patient transport apparatus 100 (e.g., the motor 188) in a manner that allows the controller 212 to control or otherwise interact with those electrical components the (e.g., via wired and/or wireless electrical communication). In some versions, the controller 212 may generate and transmit control signals to the one or more powered devices, or components thereof, to drive or otherwise facilitate operating those powered devices, or to cause the one or more powered devices to perform one or more of their respective functions.

The controller 212 may utilize various types of sensors 208 of the control system 202, including without limitation force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. One or more sensors 208 may be used to detect mechanical, electrical, and/or electromagnetic coupling between components of the patient transport apparatus 100. Other types of sensors 208 are also contemplated. Some of the sensors 208 may monitor thresholds movement relative to discrete reference points. The sensors 208 can be located anywhere on the patient transport apparatus 100, or remote from the patient transport apparatus 100. Other configurations are contemplated.

It will be appreciated that the patient transport apparatus 100 may employ light modules 210 to, among other things, illuminate the user interface 204, direct light toward the floor surface FS, and the like. It will be appreciated that the light modules 210 can be of a number of different types, styles, configurations, different types of lights (e.g., light emitting diodes LEDs), and the like without departing from the scope of the present disclosure. Similarly, it will be appreciated that the user interface 204 may employ user input controls of a number of different types, styles, configurations, and the like (e.g., capacitive touch sensors, switches, buttons, and the like) without departing from the scope of the present disclosure.

The battery 206 provides power to the controller 212, the motor 188, the light modules 210, and other components of the patient transport apparatus 100 during use, and is removably attachable to the cover 186 of the drive system 182 in the illustrated version (see FIG. 7A; attachment not shown in detail). The user interface 204 is generally configured to facilitate controlling the drive direction and drive speed of the motor 188 to move the belts 156 of the track assembly 154 and, thus, allow the patient transport apparatus 100 to ascend or descend stairs ST. Here, the user interface 204 may comprise one or more activation input controls 214 to facilitate driving the motor 188 in response to engagement by the caregiver, one or more direction input controls 216 to facilitate changing the drive direction of the motor 188 in response to engagement by the caregiver, and/or one or more speed input controls 218 to facilitate operating the motor 188 at different predetermined speeds selectable by the caregiver. The user interface 204 may also comprise various types of indicators 220 to display information to the caregiver. It will be appreciated that the various components of the control system 202 introduced above could be configured and/or arranged in a number of different ways, and could communicate with each other via one or more types of electrical communication facilitated by wired and/or wireless connections. Other configurations are contemplated.

The activation input controls 214 may be arranged in various locations about the patient transport apparatus. In the illustrated versions, a first activation input control 222 is disposed adjacent to the first hand grip region 144 of the handle assembly 132, and a second activation input control 224 is disposed adjacent to the second hand grip region 146. In the illustrated version, the user interface 204 is configured such that the caregiver can engage either of the activation input controls 222, 224 with a single hand grasping the upper grip 136 of the handle assembly 132 during use.

In the illustrated versions, the patient transport apparatus 100 is configured to limit movement of the belts 156 relative to the rails 168 during transport along stairs ST in an absence of engagement with the activation input controls 214 by the caregiver. Put differently, one or more of the controller 212, the motor 188, the geartrain 192, and/or the track assemblies 154 may be configured to "brake" or otherwise prevent movement of the belts 156 unless the activation input controls 214 are engaged. To this end, the motor 188 may be controlled via the controller 212 to prevent rotation (e.g., driving with a 0% pulse-width modulation PWM signal) in some versions. However, other configurations are contemplated, and the patient transport apparatus 100 could be configured to prevent movement of the belts 156 in other ways. By way of non-limiting example, a mechanical brake system (not shown) could be employed in some versions.

Referring now to FIG. 7A, the patient transport apparatus 100 employs the deployment lock mechanism 164 to releasably secure the track assembly 154 in the retracted position 154A and in the deployed position 154B. The deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links 226 which are pivotably coupled to the support structure 102, and brace links 228 which are coupled to the deployment lock mechanism 164 and are respectively pivotably coupled to the connecting links 226.

The connecting links 226 each comprise or otherwise define a forward pivot region 230, a connecting pivot region 232, a trunnion region 234, and an interface region 236. The forward pivot regions 230 extend from the interface regions 236 to forward pivot mounts 238 which are pivotably coupled to the rear uprights 114 about the rear seat axis RSA, such as by one or more fasteners, bushings, bearings, and the like (not shown in detail). Here, because the rear uprights 114 are spaced laterally away from each other at a distance large enough to allow the track assemblies 154 to "nest" therebetween in the retracted position 154A (see FIG. 7A), the forward pivot regions 230 of the connecting links 226 extend at an angle away from the rear uprights 114 at least partially laterally towards the track assemblies 154.

The trunnion regions 234 extend generally vertically downwardly from the interface regions 236 to trunnion mount ends 240, and comprise trunnions 242 which extend generally laterally and are arranged to abut trunnion catches 244 of the deployment lock mechanism 164 to retain the track assemblies 154 in the retracted position 154A (see FIG. 7A). The connecting pivot regions 232 extend longitudinally away from the interface regions 236 to rearward pivot mounts 246 which pivotably couple to the brace links 228 about a link axis LA. The connecting links 226 are each formed as separate components with mirrored profiles in the illustrated versions, but could be realized in other ways, with any suitable number of components.

The brace links 228 each generally extend between an abutment link end 250 and a rearward link mount 252, with a forward link mount 254 arranged therebetween. The forward link mounts 254 are pivotably coupled to the rearward pivot mounts 246 of the connecting links 226 about the link axis LA, such as by one or more fasteners, bushings, bearings, and the like (not shown in detail). The rearward link mounts 252 are each operatively attached to the deployment lock mechanism 164 about a barrel axis BA. The brace links 228 each define a link abutment surface 256 disposed adjacent to the abutment link end 250 which are arranged to abut the link stops 248 of the connecting links 226 in the deployed position 154B (see FIG. 7B). The brace links 228 also define a relief region 258 formed between the forward link mount 254 and the rearward link mount 252. The relief regions 258 are shaped to at least partially accommodate the link stops 248 of the connecting links 226 when the track assemblies 154 are in the retracted position 154A (not shown in detail). The deployment linkage 162, the deployment lock mechanism 164, and the deployment lock release 166 may be similar to as is disclosed by U.S. Patent Application Publication No. 20210196536, the disclosure of which is hereby incorporated by reference in its entirety.

Figure 8:
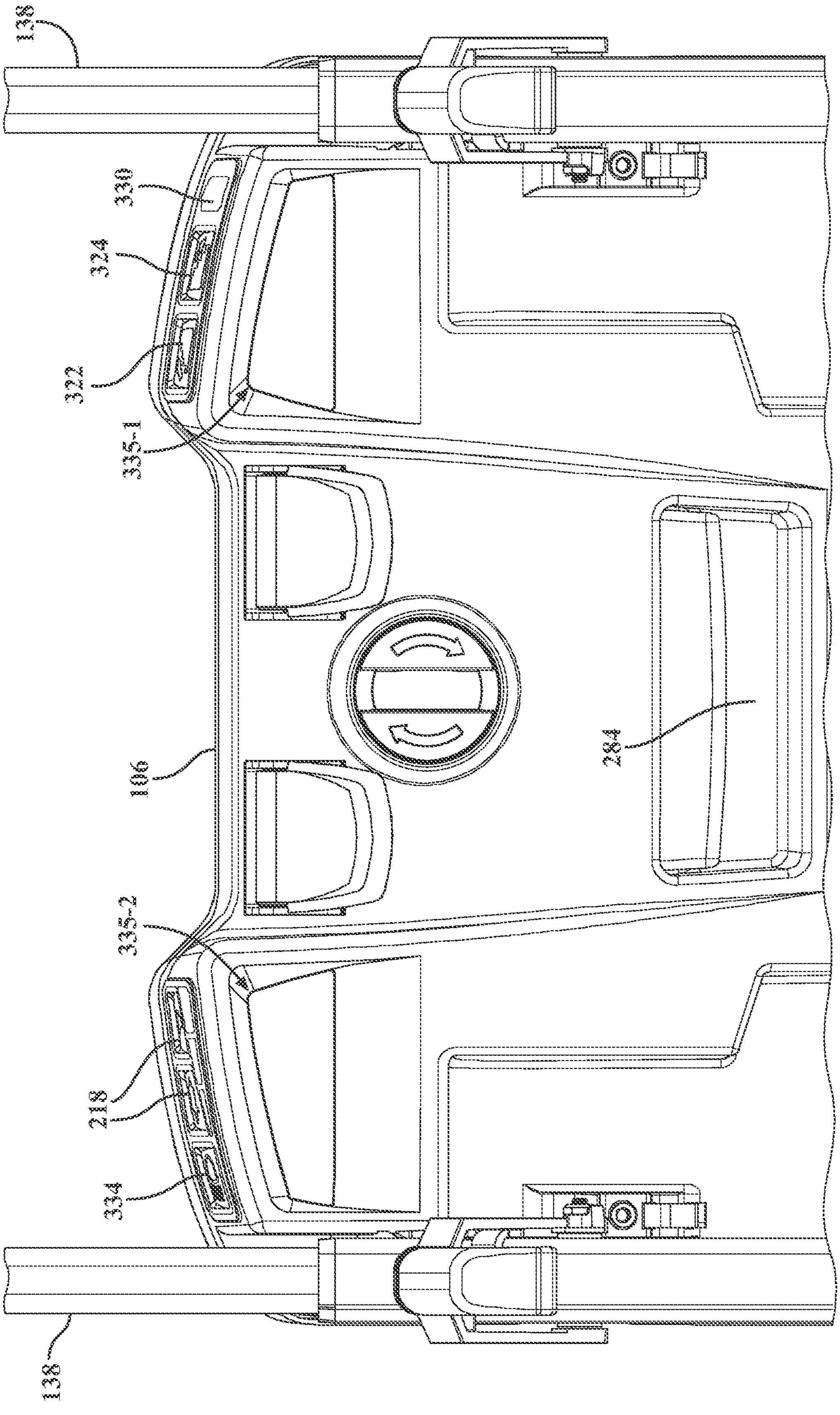
FIG. 8 is a rear view of the back side of the patient transport apparatus of FIG. 1 depicting a first upper area light module and a second upper area light module, according to the teachings of the present disclosure.

With continued reference to FIGS. 7A and 7B and additional reference to FIG. 8, the patient transport apparatus 100 employs a folding lock mechanism 284 to facilitate changing between the stowed configuration WC (see FIG. 5) and the chair configuration CC (see FIG. 6A). To this end, the folding lock mechanism 284 generally comprises a folding lock release 286 operatively attached to the back section 106 and arranged for engagement by the caregiver to releasably secure the folding lock mechanism 284 between a stow lock configuration to maintain the stowed configuration WC, and a use lock configuration to prevent movement to the stowed configuration WC from the chair configuration CC or from the stair configuration SC. The folding lock mechanism 284 may incorporate features as disclosed in U.S. Pat. No. 6,648,343 previously incorporated by reference and as disclosed in U.S. Patent Application Publication No. 20210196536, previously incorporated by reference.

The drive system 182 may include various components not specifically illustrated or be configured in various ways not discussed in detail but described in U.S. Patent Application Publication No. 20210196536, previously referenced and incorporated by reference. In an version, the motor 188 may be supported on an adjustable platform that is movable relative to the drive frame 184 to adjust slack in the endless chain. This arrangement helps to optimize power density and minimize weight in the drive system 182. It will be appreciated that this arrangement could be utilized with other types of geartrains 192, such as where a belt drive (not shown) would replace the endless chain 198. Other configurations are contemplated.

In some versions, the geartrain 192 may be configured with a direct drive gearbox coupled to one of the rails 168 of the track assembly 154. Here, the drive axle 190 extends through the direct drive gearbox, and the motor 188 may be coupled to the direct drive gearbox. In some versions, the patient transport apparatus 100 may include a "passive brake" that allows the speed of the patient transport apparatus 100 to be controlled when on stairs ST even when the battery 206 is of low charge, dead, or not connected to the drive system 182 (e.g., inadvertently removed).

Figure 9A:
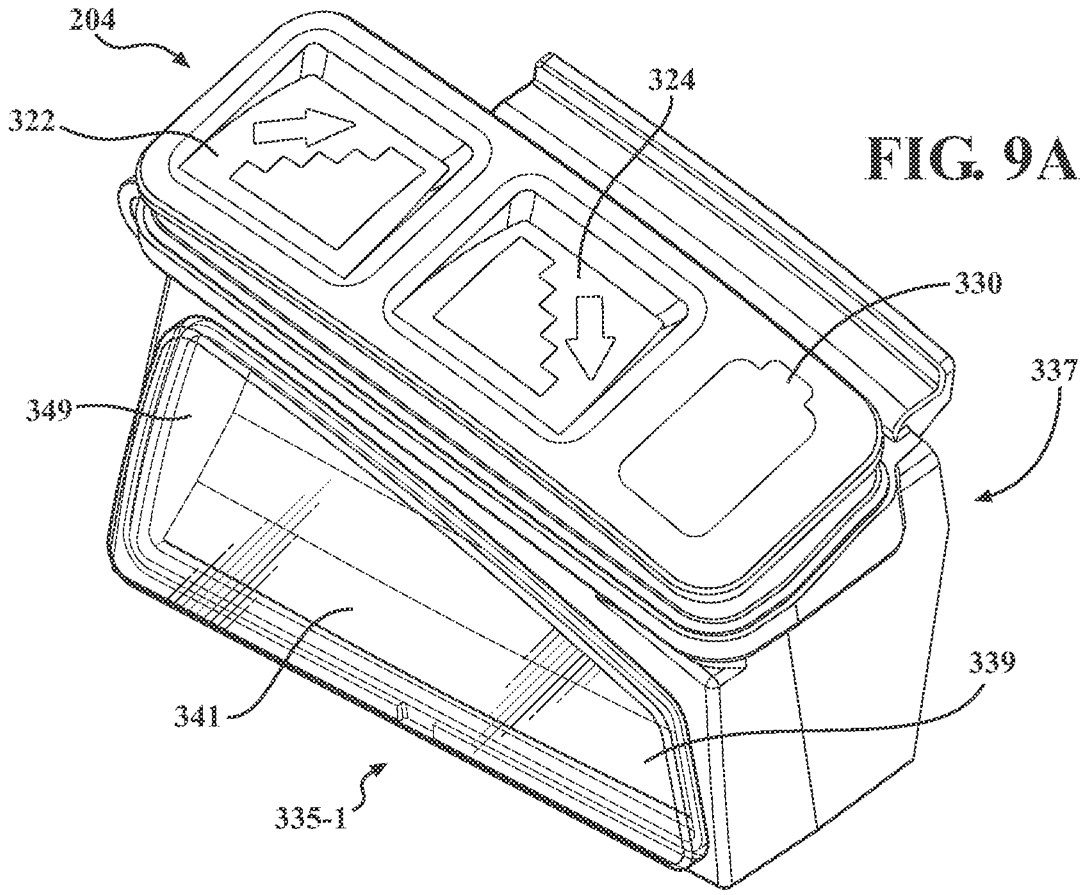
FIG. 9A is a perspective view of a first area light module of the patient transport apparatus of FIG. 1, according to the teachings of the present disclosure.
Figure 9B:
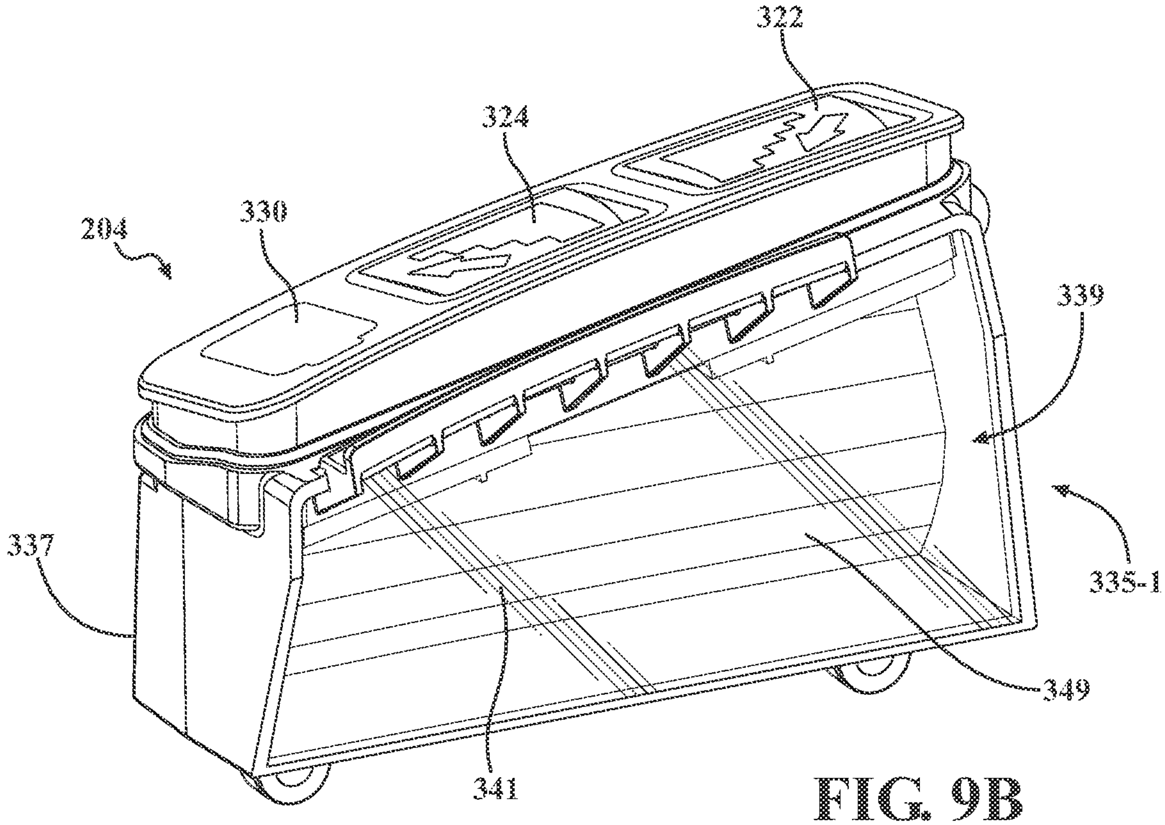
FIG. 9B is another perspective view of a first area light module of the patient transport apparatus of FIG. 1, according to the teachings of the present disclosure.
Figure 10:
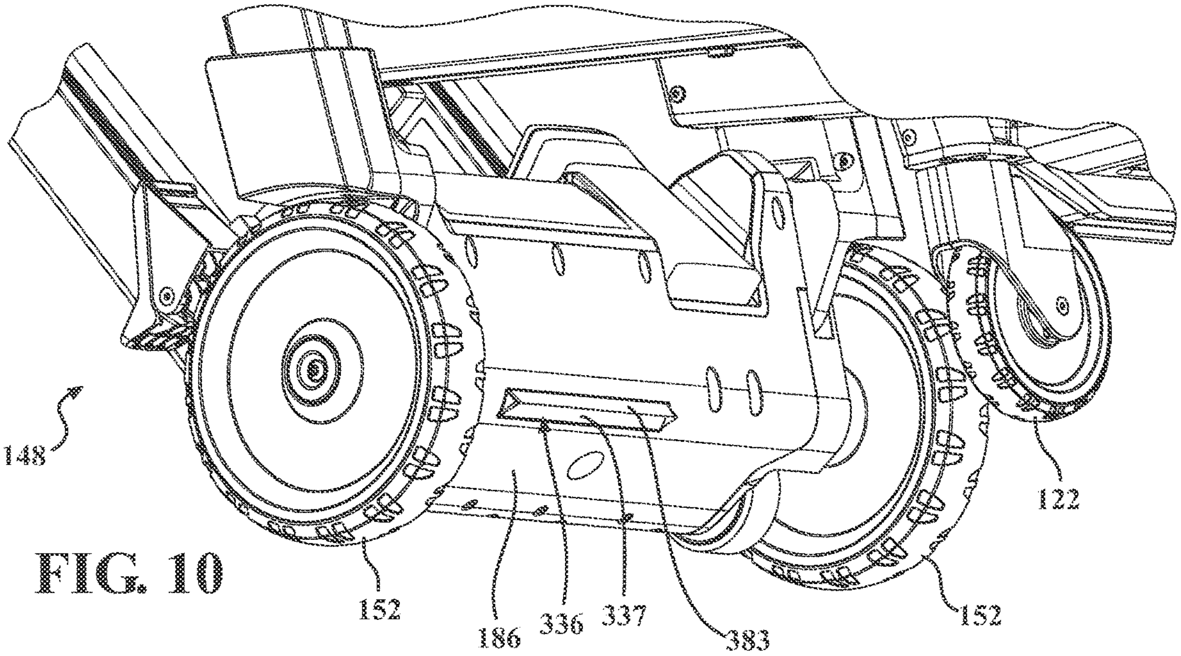
FIG. 10 is an underside view of the patient transport apparatus of FIG. 1 depicting a carrier assembly including a lower area light module, according to the teachings of the present disclosure.
Figure 11:
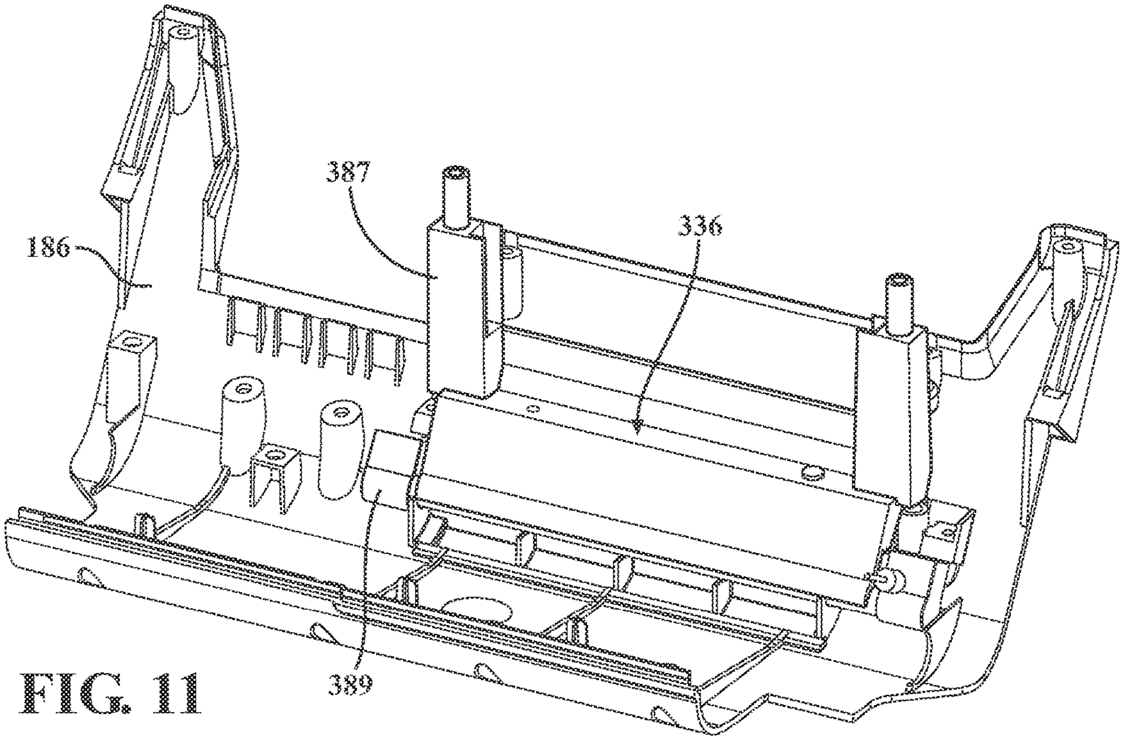
FIG. 11 is an inside view of a cover of the carrier assembly of the patient transport apparatus of FIG. 1 depicting various components of the lower area light module, according to the teachings of the present disclosure.

With reference to FIGS. 9-11, the illustrated patient transport apparatus 100 is provided with a plurality of light modules 210 including a first area light module 335-1 and a second area light module 335-2 (collectively referred to as an upper area light module 335), and a lower area light module 336. The light modules 210 are disposed in communication with the controller 212 and are configured to provide light to the surrounding area, such as the stairs ST and/or the floor surface FS (see FIG. 12A-12F). The upper area light module 335 and the lower area light module 336 may be in operative communication with the area light input control 334 such that the area light input control 334 is able to control operation of the upper area light module 335 and the lower area light module 336.

As is described in greater detail below, the user interface 204 may include an area light input control 334 arranged for engagement by the caregiver to operate light modules 210 arranged to illuminate the area surrounding the patient transport apparatus 100 (see FIGS. 1-2). Here, the light modules 210 may be realized as or otherwise include the upper area light module 335 and the lower area light module 336 The caregiver may set the upper area light module 335 and the lower area light module 336 to a first state or a second state based on engagement of the area light input control 334. The first state may be defined by emission of light from the upper area light module 335 and the lower area light module 336. The second state may be defined by the absence of emission of light from the upper area light module 335 and the lower area light module 336. While this disclosure contemplates the area light input control 334 as the sole area light input control for controlling operation of both the upper area light module 335 and the lower area light module 336, it will be appreciated that the user interface 204 may include additional area light input control so that the first upper area light module 335-1, the second upper area light module 335-2, and lower area light module 336 could be controlled independently of each other. Additionally, while examples are provided that the patient transport apparatus 100 includes the upper area light module 335 and the lower area light module 336, other configurations are contemplated.

The upper area light module 335 may include a first upper area light module 335-1 and a second upper area light module 335-2. The first upper area light module 335-1 may be coupled to a first portion of the back section 106 being adjacent to the direction input controls 322, 324 and the battery indicator 330. The second area light module 335-2 may be coupled to a second portion of the back section 106 being adjacent to the area light input control 334 and the one or more speed input controls 218. The first upper area light module 335-1 and the second upper area light module 335-2, in response to being set to the first state, direct emitted light at a rearward volume 303 (see FIGS. 12E and 12F). The rearward volume 303 may be defined by an upper shield 309 that is substantially parallel to a surface of the seat section 104. The upper shield 309 may also be substantially parallel to the pivoting handle assemblies 130.

The first upper area light module 335-1 includes a first light element (not shown in detail) and a first housing 337. The first housing 337 defines a first emission window 339. The first emission window 339 is transparent and may be constructed from glass or plastic or of any other suitable transparent material. The first housing 337 supports the first light element such that the first light element is positioned to emit the first light through the first emission window 339. The first upper area light module 335-1 may include one or more reflectors 341 positioned at a specific angle to reflect the first light at the stairs and/or floor surface as will be discussed in greater detail below. The first emission window 339 may include a first upper emission surface 349 defining the upper shield 309 of the rearward volume 303. In other words, the first upper emission surface 349 is shaped so that when the first light is directed out of the first emission window 339, the first light is directed at or below the upper shield 309 of the rearward volume 303.

The second upper area light module 335-2 is configured substantially similar to the first upper area light module 335-1 (e.g., with a profile that is generally "mirrored" relative to the first upper area light module 335-1) and, thus, the second upper area light module 335-2 is not depicted in a separate drawing. The second upper area light module 335-2 includes a second light element (not shown in detail) and a second housing. The second housing defines a second emission window. The second emission window is transparent and may be constructed from glass or plastic or of any other suitable transparent material. The second housing supports the second light element (not illustrated) such that the second light element is positioned to emit the second light through the second emission window. The second upper area light module 335-2 may include one or more reflectors positioned at a specific angle to reflect the second light at the stairs and/or floor surface as will be discussed in greater detail below. The second emission window may also include a second upper emission surface defining the upper shield 309 of the rearward volume 303. In other words, the second upper emission surface is shaped so that when the second light is directed out of the second emission window, the second light is directed at or below the upper shield 309 of the rearward volume 303.

The first light element may be integrated with one or more components that also interact with the direction input controls 322, 324 and/or the battery indicator 330. Put differently, the first upper light module 335-1 may share one or more circuits, sub-controllers, or printed circuit boards (PCBs), or other components with the direction input controls 322, 324 and/or the battery indicator 330. The second light element may be integrated with one or more components of the area light input control 334 or the one or more speed input controls 218. Stated differently, the second upper area light module 335-2 may share one or more circuits, sub-controllers, or printed circuit boards (PCBs), or other components with the area light input control 334 and/or the one or more speed input controls 218. By integrating the first upper area light module 335-1 and the second upper area light module 335-2 with one or more of input controls, 218, 334, 332, 324 or the battery indicator 330, additional components (e.g., cables, connectors, etc.) are reduced which also reduces the number of components that must be sealed for water ingress, reduces the cost of manufacturing, reduces the overall weight and complexity of the design.

The lower area light module 336 may include a light element 389 and a retention mechanism 387. The light element 389 may be secured to an inner surface of the cover 186 by the retention mechanism 387 using any suitable fastener. The light element 389 may be at least partially exposed by an aperture in the cover 186 such that light is emitted through the aperture. The cover 186 may be shaped to include a visor 383 that extends over a portion of the aperture to direct emitted light ELF to a forward volume 307 (see FIGS. 12E and 12F) being partially defined by a lower shield 311 (see FIGS. 12E and 12F). The lower area light module 336 may be configured to emit light ELF in different directions relative to the seat section 104 (as well as to other components) as the patient transport apparatus 100 moves between the chair configuration CC (see FIG. 1) and the stair configuration SC (see FIG. 2).

The lower area light module 336 is arranged so as to emit light ELF toward the forward volume 307 which is generally forward and toward the floor surfaces FS when the patient transport apparatus 100 operates in the chair configuration CC and to emit light ELF directed at the forward volume 307 which is generally forward and more upward when the patient transport apparatus 100 operates in the stair configuration SC than forward volume 307 is when the patient transport apparatus 100 operates in the chair configuration CC. As described in greater detail below, this configuration may advantageously direct emitted light ELF away the second caregiver as to prevent obstruction of the view of the second caregiver when transporting the patient down the stairs ST with the patient transport apparatus 100 while still affording illumination of the surrounding area.

Figure 12A:
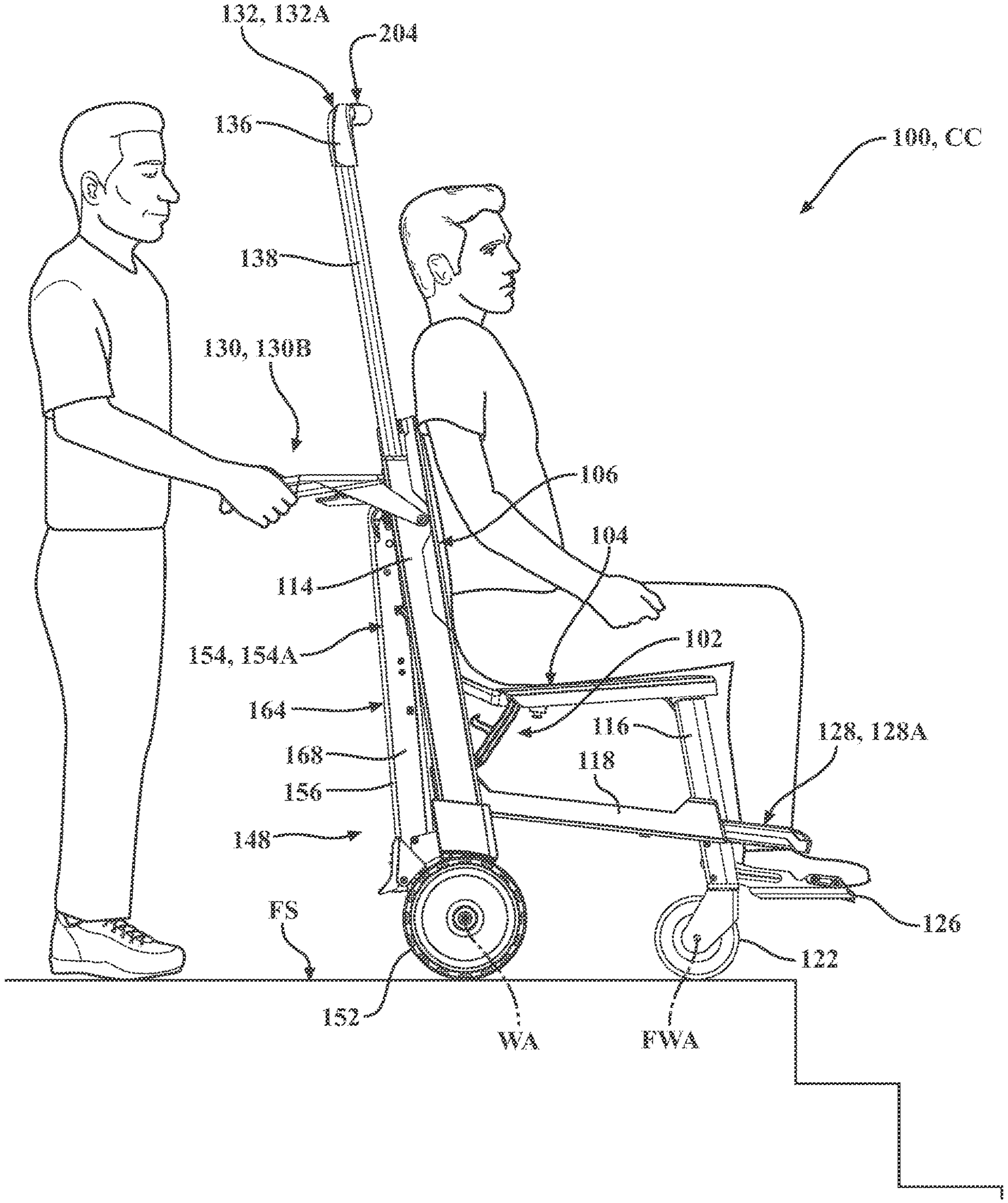
FIG. 12A is a right-side plan view of the patient transport apparatus of FIG. 1, shown supporting a patient in the chair configuration on a floor surface adjacent to stairs, and shown with a first caregiver engaging a pivoting handle assembly, according to the teachings of the present disclosure.
Figure 12B:
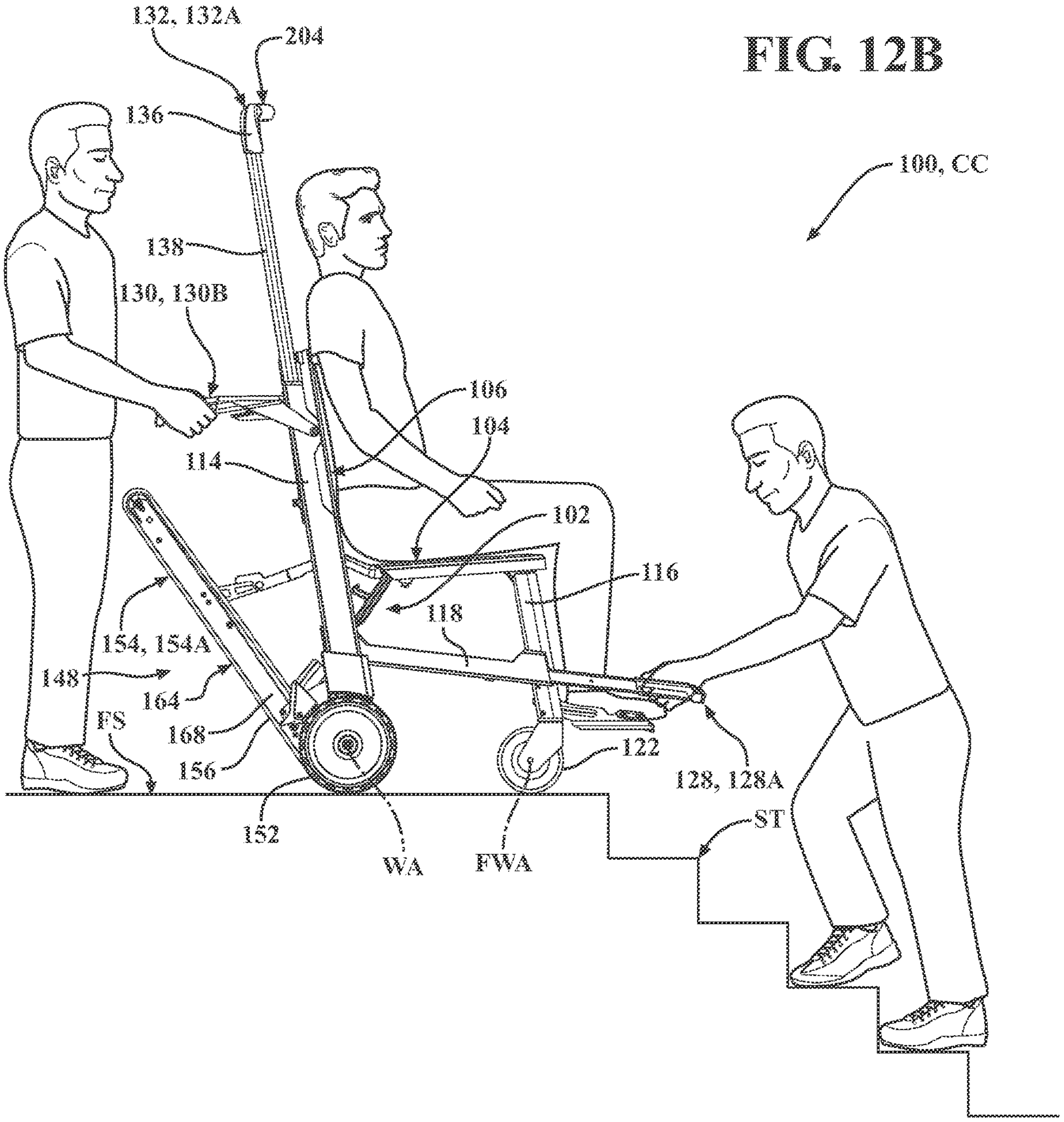
FIG. 12B is another right-side plan view of the patient transport apparatus of FIG. 12A, shown with the first caregiver having engaged the deployment lock mechanism to move the track assembly out of the retracted position and a second caregiver engaging a front handle assembly in an extended position, according to the teachings of the present disclosure.
Figure 12C:
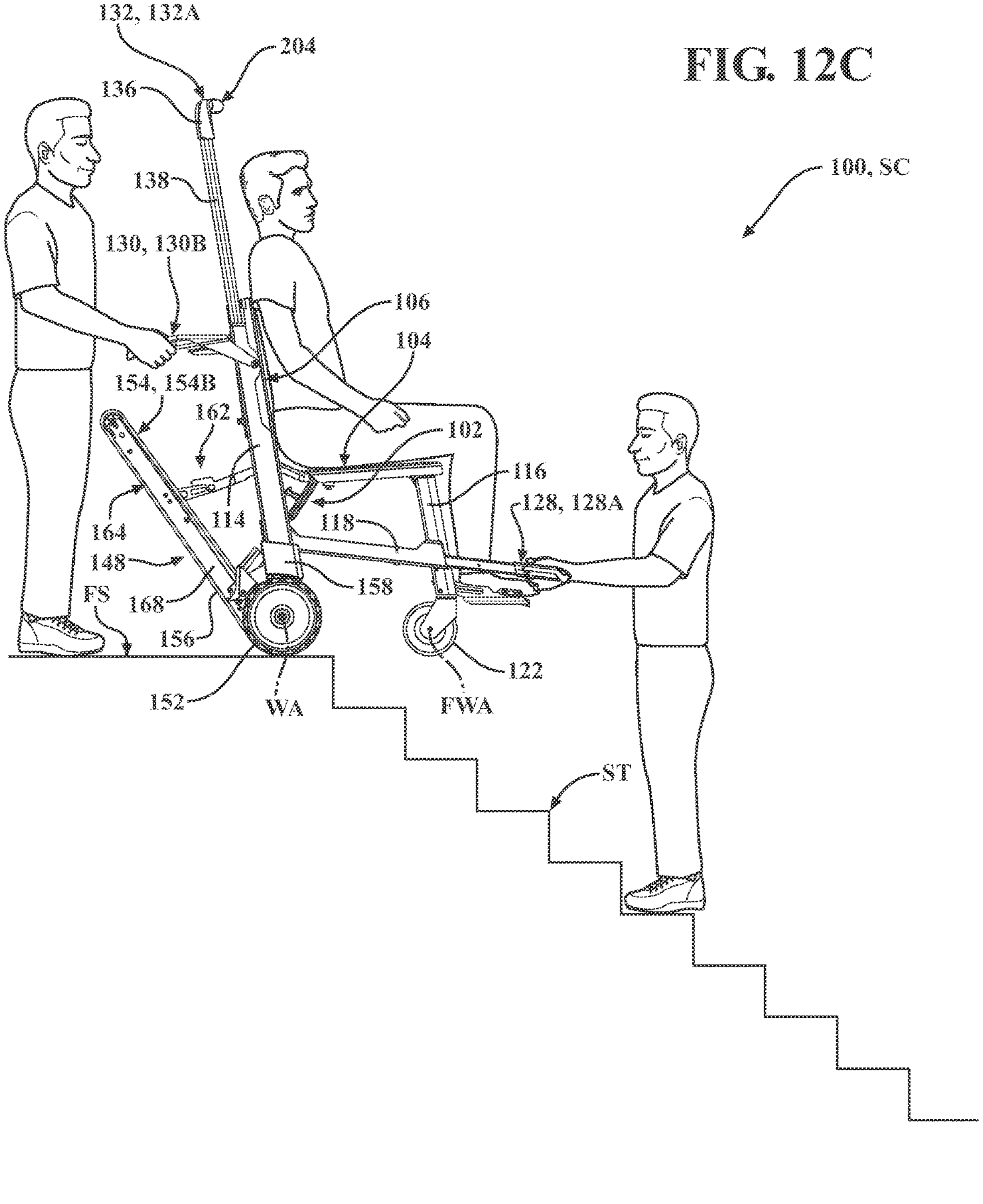
FIG. 12C is another right-side plan view of the patient transport apparatus of FIG. 12B, shown having moved towards the stairs for descent while supported by the first and second caregivers, according to the teachings of the present disclosure.
Figure 12D:
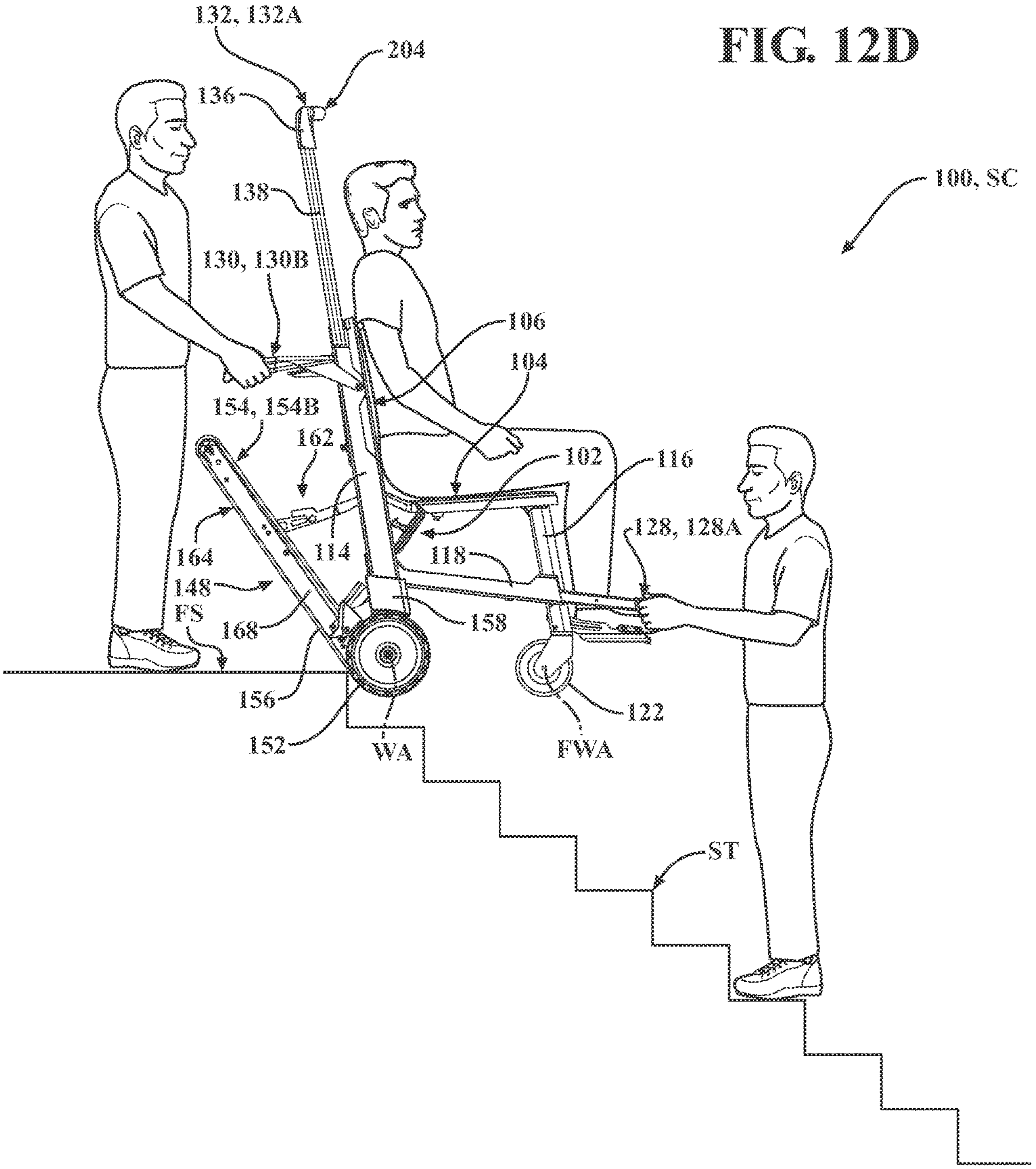
FIG. 12D is another right-side plan view of the patient transport apparatus of FIG. 12C, shown having moved initially down the stairs for descent to bring a belt of the track assembly into contact with the stairs while still supported by the first and second caregivers, according to the teachings of the present disclosure.

FIGS. 12A-12F successively depict exemplary steps of transporting a patient supported on the patient transport apparatus 100 down the stairs ST. In FIG. 12A, a first caregiver is shown engaging the pivoting handle assemblies 130 in the engagement position 130B to illustrate approaching stairs ST while the patient transport apparatus 100 is moved along floor surfaces FS in the chair configuration CC. In FIG. 12B, the patient transport apparatus 100 has been moved closer to the stairs with a second caregiver engaging the front handle assemblies 128 after having moved them to the extended position 128B. The deployment lock release 166 was also deployed by the first caregiver to move the patient transport apparatus 100 into the stair configuration SC as shown. As shown in the stair configuration SC, the track assemblies 154 are arranged in the deployed position 154B. Here, the rear wheels 152 are positioned significantly closer to the front wheels 122 compared to operation in the chair configuration CC, and are also arranged further under the seat section 104. It will be appreciated that transitioning the patient transport apparatus 100 from the chair configuration CC to the stair configuration SC has resulted in minimal patient movement relative to the support structure 102 as the carrier assembly 148 pivots about the hub axis HA and moves the rear wheels 152 closer to the front wheels 122 in response to movement of the track assemblies 154 to the deployed position 154B.

Furthermore, while the arrangement of the patient's center of gravity has not changed significantly relative to the support structure 102, the longitudinal distance which extends between the patient's center of gravity and the location at which the rear wheels 152 contact the floor surface FS has shortened considerably. Because of this, the process of "tilting" the patient transport apparatus 100 (e.g., about the rear wheels 152) to transition toward contact between the track assemblies 154 and the stairs ST, as depicted in FIG. 12C, is significantly more comfortable for the patient than would otherwise be the case if the patient transport apparatus 100 were "tilted" about the rear wheels 152 from the chair configuration CC (e.g., with the rear wheels 152 positioned further away from the front wheels 122). Put differently, the arrangement depicted in FIG. 12C is such that the patient is much less likely to feel uncomfortable, unstable, or as if they are "falling backwards" during the "tilting" process. Here too, the caregivers are afforded with similar advantages in handling the patient transport apparatus 100, as the arrangement of the rear wheel 152 described above also makes the "tilting" process easier to control and execute. In FIG. 12D, the caregivers are shown continuing to support the patient transport apparatus 100 in the stair configuration SC as the belts 156 of the track assemblies 154 are brought into contact with the edge of the top stair ST.

Figure 12E:
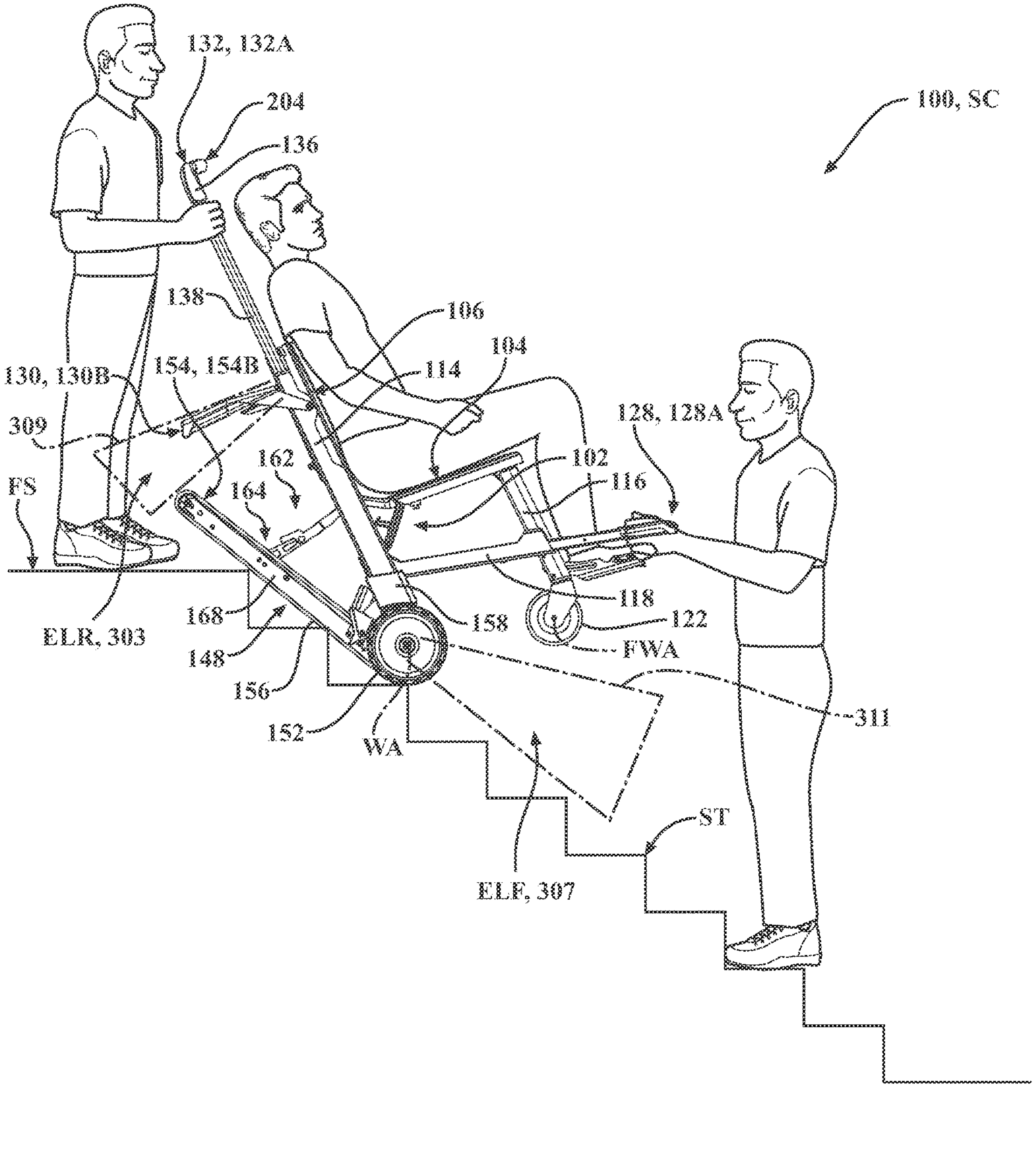
FIG. 12E is another right-side plan view of the patient transport apparatus of FIG. 12D, shown with the belt of the track assembly in contact with the stairs while still supported by the first and second caregivers, according to the teachings of the present disclosure.
Figure 12F:
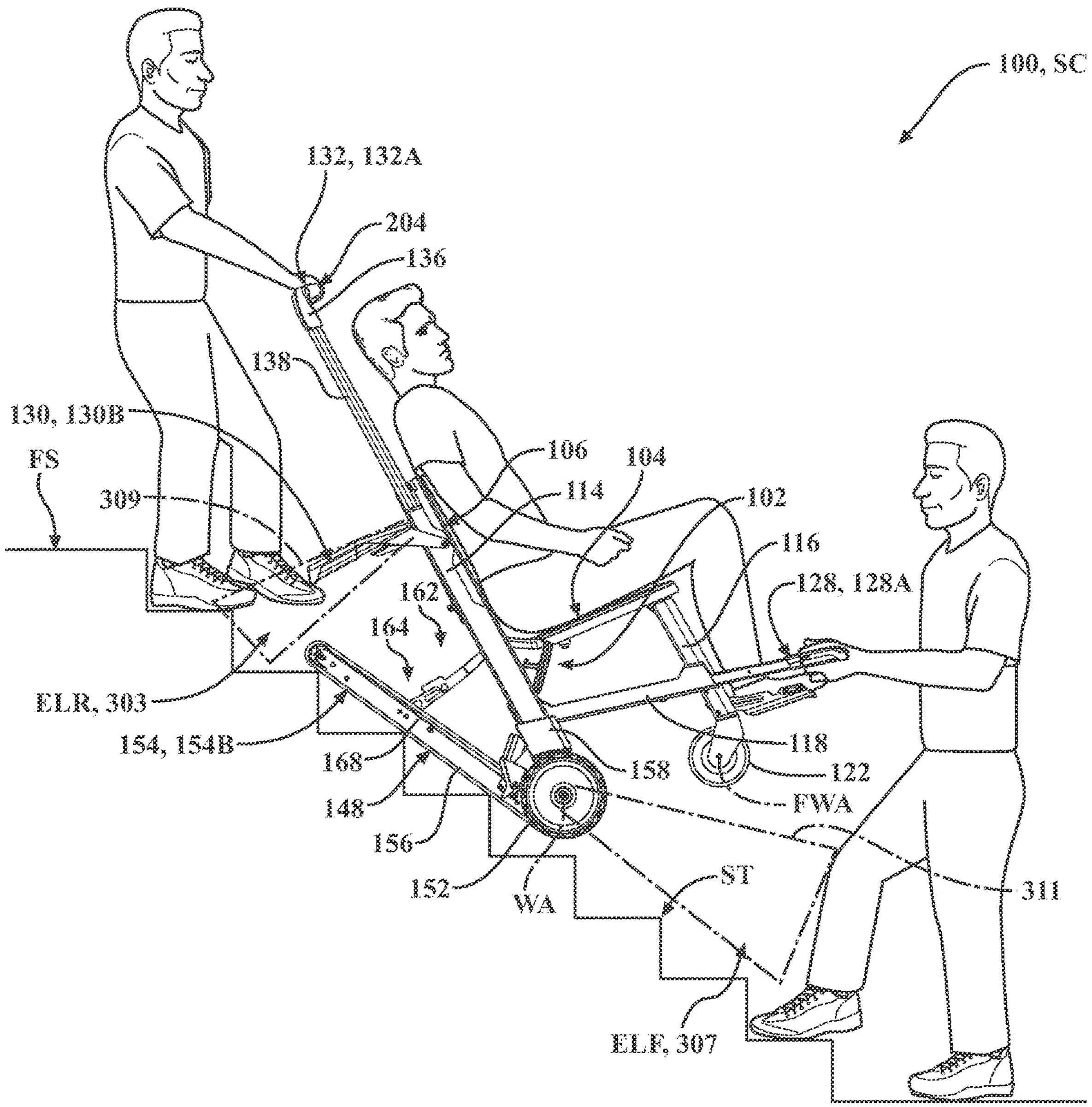
FIG. 12F is another right-side plan view of the patient transport apparatus of FIG. 12D, shown with the belt of the track assembly in contact with the stairs while still supported by the first and second caregivers and with first caregiver having engaged an area light input control to illuminate the upper and lower area light modules, according to the teachings of the present disclosure.

In FIGS. 12E and 12F, the caregivers are shown continuing to support the patient transport apparatus 100 in the stair configuration SC as the belts 156 of the track assemblies 154 contact multiple stairs ST during descent. The first caregiver has engaged the area light input control 344 so that the upper area light module 335 and the lower area light module 336 are operating in the first state. The light emitted ELR from the upper area light module 335 and directed at the stairs is constrained to the rearward volume 303. As previously discussed, the rearward volume 303 is partially defined by the upper shield 309 which is substantially parallel with a surface of the seat section 104 and also substantially parallel with pivot handle assemblies 130. The upper area light modules 335 are designed so that the light emitted ELR does not propagate beyond the upper shield 309 and obstruct or hinder the view of the first caregiver while traversing the stairs.

The light emitted ELF from the lower area light module 335 is directed at the stairs and constrained to the forward volume 307. The forward volume 307, as previously discussed, is partially by a lower shield 311. As shown, the lower shield 311 generally extends away from the front handle assemblies 128. The lower area light module 336 is designed so that light emitted ELF does not propagate beyond the lower shield 311 and obstruct or hinder the view of the second caregiver while traversing the stairs ST.

The patient transport apparatus 100 is configured to operate in a variety of states and modes in certain versions, including for example in or between one or more inactive states SI and/or one or more active states SA. During the inactive state SI, power consumption of the patient transport apparatus 100 is limited as the motor is not controlling movement of the belt during this state, and during the active state SA the controller 212 may be utilized to control movement of the belt 156 with the motor 188 of the patient transport apparatus 100.

It will be appreciated that the controller 212 may be configured to operate in a variety of inactive states SI and active states SA. The controller 212 may be configured to operate in (or between) a sleep mode MS of the inactive state SI and an active mode MS of the inactive state SI. The controller 212 may also operate in a variety of inactive states, for example, a low charge mode MLC of the inactive state SI, and/or a battery disconnect mode MBD of the inactive state SI which are discussed in detail in U.S. Patent Application Publication No. 20210196539A1, the disclosure of which is hereby incorporated by reference in its entirety.

During the sleep mode MS of the inactive state SI, power consumption of the patient transport apparatus 100 is limited. In some versions, power consumption of the patient transport apparatus 100 may be limited by only allowing the controller 212 to provide power from the battery 206 to certain components of the patient transport apparatus 100. For example, during the sleep mode MS, the controller 212 may be unable to generate and transmit control signals to some of the one or more powered devices, or components thereof, to drive the patient transport apparatus 100. Here, however, the controller 212 may be configured to provide power to the user interface 204. In the sleep mode MS, the user interface 204 may be prevented from emitting light, but may be configured to receive input generate by user engagement of any portion of the user interface 204. Additionally, in some instances of the sleep mode MS, one or more of the controller 212, the motor 188, the geartrain 192, and/or the track assemblies 154 may also be configured to "brake" or otherwise prevent movement of the belts 156.

During active mode MA of the inactive state, the controller 212 may not limit power consumption of any component of the patient transport apparatus 100. For example, the user interface 204 may emit light for a predetermined period of time in response to user engagement of one of the input controls 214, 216, 218, 222, 224, 322, 324, 326, 328, and 334. Various other components of the patient transport apparatus 100 may be provided power upon demand without limitation during the active mode MA of the inactive state SI.

The controller 212 may be configured to operate in a drive mode MD during the active state SA to control a direction of movement of the belt 156. In some versions, the controller 212 may be configured to additionally operate in additional modes to the drive mode during the active state SA such as a hold mode MH of the active state SA for limiting movement of the belt 156 to facilitate a controlled descent of the patient transport apparatus 100 along stairs ST. The hold mode is disclosed by the discussed in detail in U.S. Patent Application Publication No. 20210196539A1, previously incorporated by reference.

In some versions, the user interface 204 may comprise one or more light modules 210 realized as backlight modules 338 arranged to illuminate various input controls 214, 216, 218, 222, 224, 322, 324, 326, 328, 334 and/or indicators 220, 330, 332 under certain operating conditions. In some versions, the user interface 204 may comprise one or more light modules 210 configured to, among other things, provide status information to the caregiver. In some versions, one or more direction light modules 340 could be provided adjacent to the direction input control(s) 216, 322, 324 to indicate a selected drive direction to the caregiver, alert the caregiver of a need to interact with the user interface 204, and the like. In some versions, one or more activation light modules 342 could be provided adjacent to the activation input controls 214, 222, 224 to indicate a current operating state of the patient transport apparatus 100 (e.g., the operating state of the motor 188) to the caregiver, alert the caregiver of a need to interact with the user interface 204, and the like.

In some versions, one or more area light input modules 344 could be provided adjacent to the area light input control 334 to indicate a status of the upper area light module 335 and the lower area light module 336 to the caregiver, alert the caregiver of a need to interact with the user interface 204, and the like. In some versions, one or more battery light modules 346 may be provided as a part of (or otherwise adjacent to) the battery indicator 330 to indicate a status of the charge state of the battery 206 to the caregiver, alert the caregiver of a need to interact with the user interface 204, and the like. In some versions, one or more speed light modules 348 may be provided as a part of (or otherwise adjacent to) the speed indicator 332 and/or the speed input control(s) 218, 326, 328 to indicate a selected one of a plurality of drive speed DS1, DS2, DS3 to the caregiver, alert the caregiver of a need to interact with the user interface 204, and the like.

In the representative version illustrated herein, the controller 212 may be operable in sleep mode in which power consumption is limited, and the active mode SA in which power consumption is not limited such as when the controller 212 controls movement of the belt 156 with the motor 188 of the patient transport apparatus 100. As previously described, the controller 212 may be configured to operate in a variety of other modes/states not explicitly discussed herewith but discussed in greater detail in U.S. Patent Application Publication No. 20210196539A1, previously incorporated by reference.

As noted above, the one or more light modules 210 may include one or more backlight modules 338 disposed in communication with the controller 212. The controller 212 may be configured to operate the backlight modules 338 such that the user is able to visually discern whether the controller 212 is in sleep mode or active mode. For example, the controller 212 may be configured to operate the backlight module 338 in first and second illumination states ISB1, ISB2. In some versions, the first illumination state ISB1 may be defined by the absence of light emission and the second illumination state ISB2 may be defined by light emission. It will be appreciated that the first and second illumination states ISB1, ISB2 of the backlight module 338 could be defined in other ways sufficient to differentiate from each other. By way of non-limiting example, first and second illumination states ISB1, ISB2 could be defined by emission of light at different brightness levels (e.g., dimmed or changing between dimmed and brightened), in different colors, blinking patterns and the like. Other configurations are contemplated.

Figure 13:
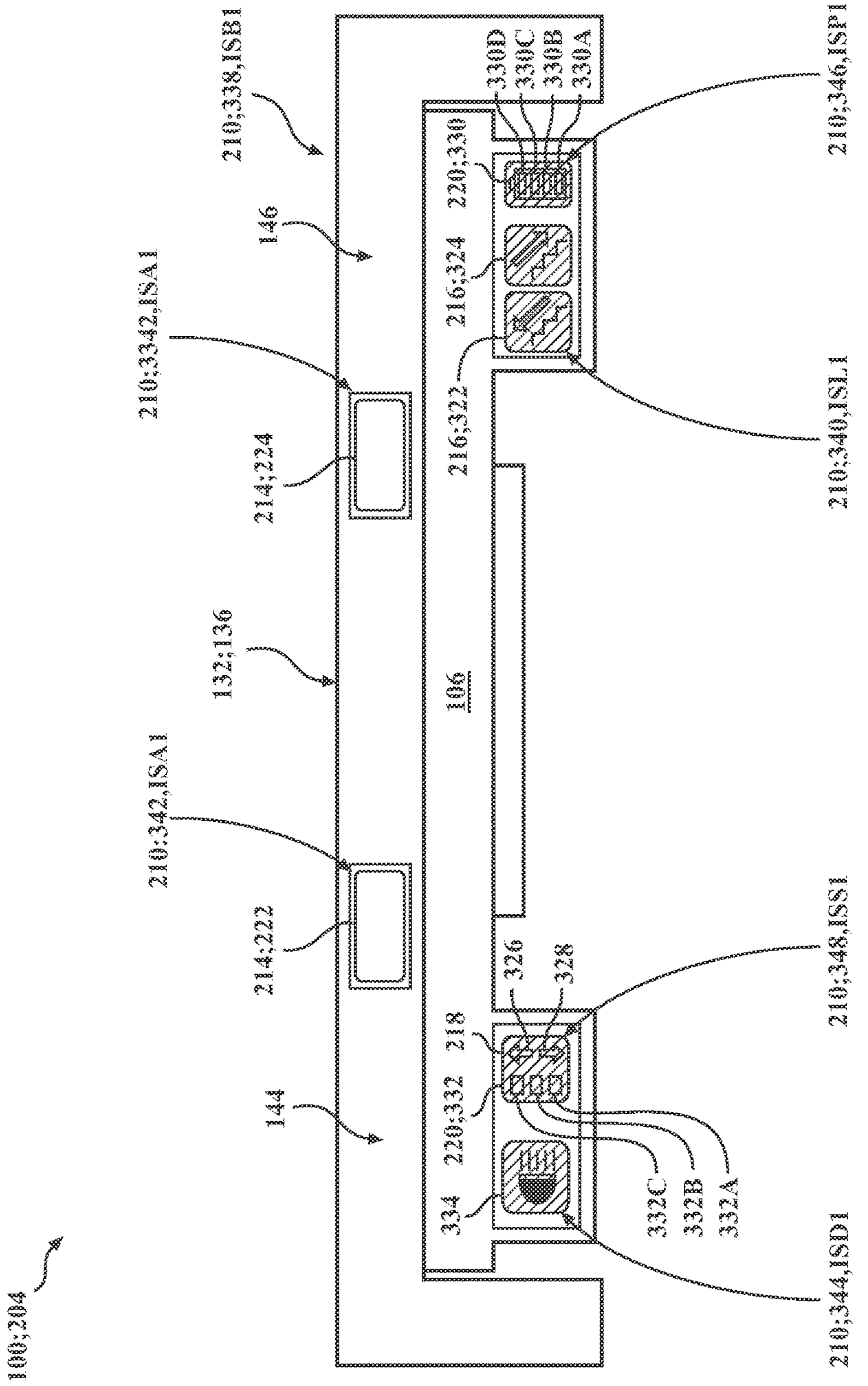
FIG. 13 is a schematic, top-side view of a user interface of the patient transport apparatus of FIGS. 1, shown depicted in sleep mode, according to the teachings of the present disclosure.

In the illustrated version of FIG. 13, the controller 212 is shown in a sleep mode MS. During the sleep mode MS, the controller **21*s*2 may be configured to operate the backlight module 338 in the first illumination state ISB1. In this representative version, during the first illumination state ISB1, the backlight module 338 does not emit any light and thus no portion of the user interface 204 is illuminated. In response to receiving user input to any portion of the user interface 204, such as one or more controls 214, 216, 218, 222, 224, 322, 324, 326, 328, 334, the controller 212** may be configured to switch from the sleep mode MS to active mode MA.

Figure 14:
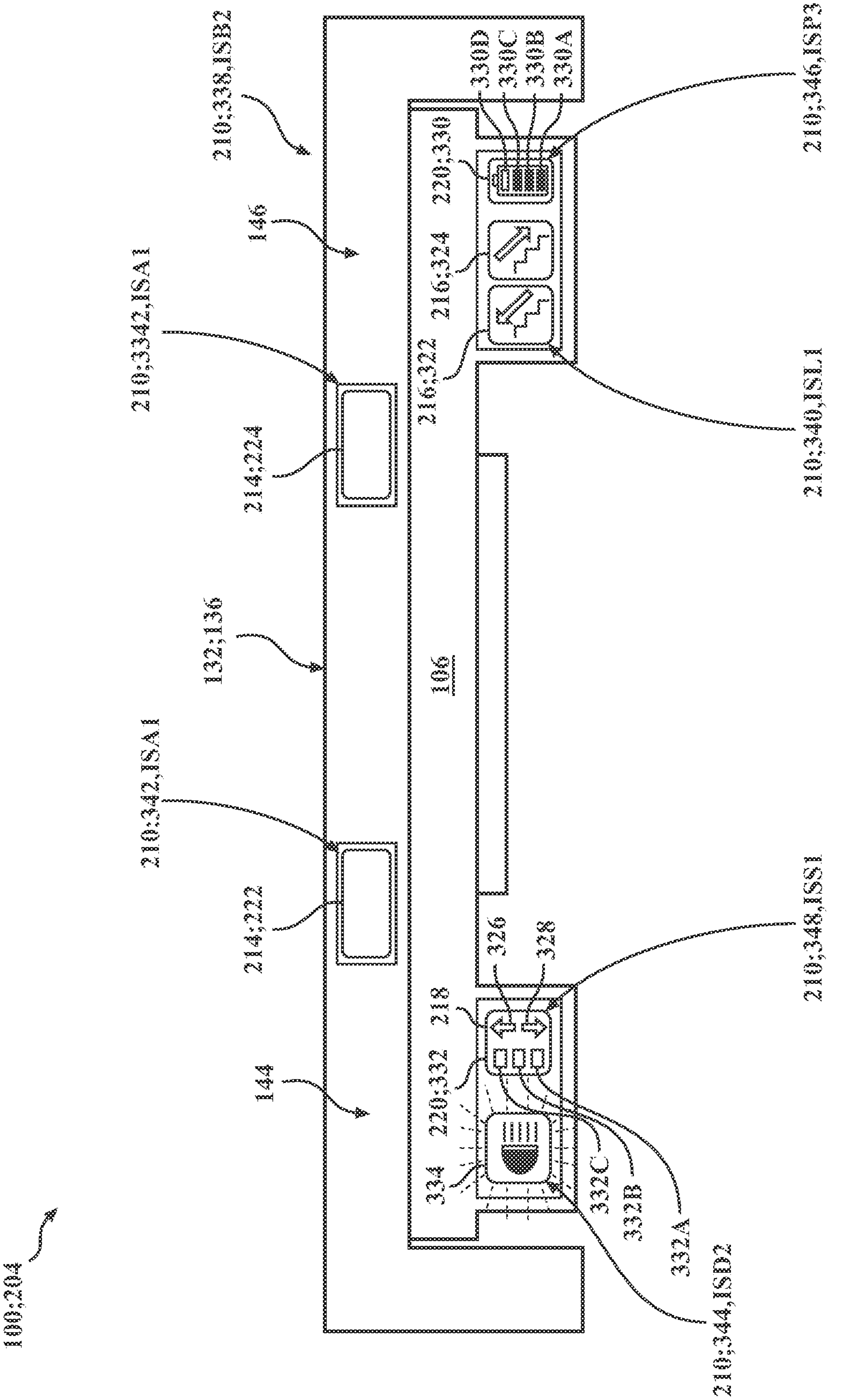
FIG. 14 is a schematic, top-side view of a user interface of the patient transport apparatus of FIGS. 1, shown depicted in active mode, according to the teachings of the present disclosure.

Additionally, in response to the controller 212 switching from the sleep mode MS to active mode MA, the controller 212 may be configured to switch the backlight module 338 from the first illumination state ISB1 to the second illumination state ISB2 as shown in FIG. 14. During the second illumination state ISB2, the backlight module 338 may be configured to at least partially illuminate one or more controls 214, 216, 218, 222, 224, 322, 324, 326, 328, 334 and/or indicators 220, 330, 332, of the user interface 204. In the illustrated version of FIG. 14, the backlight module 338 is shown operating in the second illumination state ISB2 such that the direction input controls 216, the battery indicator 330, speed input controls 218, area light input control 334, the speed indicator 332, and the speed input controls 218 are all illuminated with backlighting.

With patient transport apparatuses of the prior art, when a user engages an area light input control similar to area light input control 334 of the present disclosure while a controller is operating in sleep mode, the controller will switch to active mode but not actually operate as associated area light module until the area light input control is engaged for a second time. Stated differently, in systems of the prior art, a controller will only operate an area light module associated with an area light input control when the area light input control is engaged while in active mode. With the patient transport apparatus 100 of the present disclosure, in addition to switching from sleep mode MS to active mode MA in response to receiving user input to the area light input control 334, the controller 212 may also operate the upper area light module 335 and the lower area light module 336 in the first state. Thus, with the patient transport apparatus 100 according to the teachings of the present disclosure, the caregiver does not have to engage the area light input control 334 for a second time if seeking to engage the lower area light module 335 from the sleep mode MS.

Irrespective of the specific configuration and/or arrangement of the upper area light module 335 and the lower area light module 336, the area light input control 334 may be configured to operate the upper area light module 335 and the lower area light module 336 to emit light in response to user engagement of the area light input control 334. In some versions, the controller 212 may be configured to operate the area light input module 344 in a first illumination state ISD1 and a second illumination state ISD2 so as to provide visual cues as to an operating state of the upper area light module 335 and the lower area light module 336.

The first illumination state ISD1 may be defined by the absence of light emission. The area light input module 344 is shown in the first illumination state ISD1 in FIG. 13. The second illumination state ISD2 may be defined by light emission. The area light input module 344 is shown in the second illumination state ISD2 in FIG. 14 after engagement by the user. It will be appreciated that the first and the second illumination states ISD1, ISD2 of the area light input module 344 could be defined in other ways sufficient to differentiate from each other. By way of non-limiting example, the first and second illumination states ISD1, ISD2 could be defined by emission of light at different brightness levels (e.g., dimmed or changing between dimmed and brightened), in different colors, blinking patterns and the like. Other configurations are contemplated. The controller 212 may set or otherwise determine the predetermined period based on an operating state of the area light input module 344. In response to area light input module 344 being OFF (e.g., the area light input module 344 is in the first illumination state ISD1), the controller 212 may set the time threshold to three minutes. In response to the area light module 336 being ON (e.g., the area light input module 344 is in the second illumination state TSD2), the controller 212 may set the timer threshold to fifteen minutes. While the examples of three minutes and fifteen minutes are provided, the controller 212 may be configured to the predetermined period or to other suitable times.

The controller 212 may be configured to automatically enter the sleep mode MS of the inactive state SI based on the absence of user engagement with the user interface 204. The automatic sleep mode MS may be disabled or deactivated in response to engagement of any one of the input controls in order to prevent the controller 212 from entering automatic sleep mode MS. For example, the user may wish to prevent the controller 212 from entering automatic sleep mode while the area light modules 335, 336 are illuminating the surrounding area. The controller 212 may be configured to determine an absence of user engagement with the user interface 204 over a predetermined period. The controller 212 may include a first power countdown timer that is activated in response to the controller 212 switching to an active state SA and the activation input controls 214 being disengaged. For example, after the user has disengaged the area light input control 334, the controller 212 may activate the first power countdown timer. The first power timer may be set to expire after a first period of time, such as three minutes or another suitable duration of time. The first power countdown timer may be reset in response to engagement of any portion of the user interface 204. In response to determining the absence of user engagement of the user interface 204 at the end of the predetermined period such as when the first power countdown timer has elapsed, the controller 212 may switch from the active mode MA to the sleep mode MS.

The controller 212 may be configured to generate a warning to indicate to the user that the controller 212 will be entering automatic sleep mode MS absent user engagement of the user interface prior the first power countdown timer expiring. For example, in response to the first power countdown timer reaching a threshold time (e.g., 20 seconds before expiration of the first power countdown timer), the controller 212 may switch operation of the area light modules 335, 336 from the first state to a third state so that the user is provided with a visual cue that the controller 212 will switch to automatic sleep mode absent user engagement of the user interface 204 before the first power countdown timer expires. During the third state, the controller 212 may control one or both the area light modules 335, 336 to change the way the light being emitted appears. For example, during the third state, the controller 212 may flash the light emitted from one or both the area light modules 335, 336. While the example is provided that the warning is provided to the user via the area light module 335, 336, the warning may be provided in a different manner. For example, the controller 212 may control one or more devices of the patient transport apparatus 100 to provide the warning to the user. For example, the patient transport apparatus may include a speaker configured to provide an audible alarm in response to the first power countdown timer reaching the threshold time or a haptic device configured to provide a haptic alert for the user in response to the first power countdown timer reaching the threshold time. The controller 212 may also operate one of the components of the user interface such as one of the associated light modules 210 to provide a visual warning to the user in response to the first power countdown timer reaching the threshold time.

The controller 212 may also include a second power countdown timer. The second power countdown timer may be set to expire after a second period of time, such as fifteen minutes or another suitable period of time, that is longer than the first period of time set for the first power countdown timer. In response to user engagement of the user interface 204 prior to expiration of the first power countdown timer, the controller 212 may activate the second power countdown timer and deactivate the first power countdown timer. The controller 212 may be configured to generate a warning, similar to that discussed with respect to expiration of the first power countdown timer, to indicate to the user that the controller 212 will be entering automatic sleep mode MS absent user engagement of the user interface prior the second power countdown timer expiring.

The battery indicator 330 may be configured to display a charge state of the battery 206 to the user. The state of charge of the battery 206 may be based on a voltage of the battery 206. The battery indicator 330 may include a plurality of bars 330A, 330B, 330C, 330D or other indicia. As noted above, the one or more light modules 210 may include one or more battery light modules 346 disposed adjacent or underneath to the battery indicator 330. The controller 212 may be configured to operate the battery light module 346 in a first illumination state ISP1, a second illumination state ISP2, a third illumination state ISP2, a fourth illumination state ISP4, a fifth illumination state ISP5, and a sixth illumination state ISP6. In response to the controller 212 being in the sleep mode MS of the inactive state SI, the controller 212 may operate the battery light module 346 in the first illumination state ISP1 in which none of the bars 330A, 330B, 330C, 330D are illuminated (e.g., there is an absence of light emission).

When the controller 212 switches from sleep mode MS to active mode MA, the controller 212 may operate the battery light module to display a current level of charge. In response to the state of charge of the battery 206 falling within a first predetermined range, the controller 212 may operate the battery light module 346 in the second illumination state ISP2 in which all four bars 330A, 330B, 330C, 330D are illuminated. The first predetermined range may be set from 76-100%. In response to the state of charge of the battery 206 falling within a second predetermined range, the controller 212 may operate the battery light module 346 in the third illumination state ISP3 in which first, second, and third bars 330A, 330B, 330C are illuminated. The second predetermined range may be set from 51-75%. In response to the state of charge of the battery 206 falling within a third predetermined range, the controller 212 may operate the battery light module 346 in the fourth illumination state ISP4 in which the first and second bars 330A, 330B are illuminated. The third predetermined range may be set from 26-50%. In response to the state of charge of the battery 206 falling within a fourth predetermined range, the controller 212 may operate the battery light module 346 in the fifth illumination state ISP5 in which the first bar 330A is illuminated. The fourth predetermined range may be set to 15-25%. In response to the state of charge of the battery 206 falling within a fifth predetermined range, the controller 212 may operate the battery light module 346 in the sixth illumination state ISP6 in which the first bar 330A is illuminated in an oscillating manner (e.g., flashing manner). The fifth predetermined range may be set to 5-15%.

In some instances, the controller 212 may also illuminate the activation light module 342 in a third illumination state ISA3 in order to communicate to the user that the state of charge of the battery 206 is below the threshold value. While example ranges are provided for the first, second, third, fourth, and fifth predetermined ranges and an example threshold value is provided, the controller 212 may be configured to set the ranges to alternative ranges and the threshold value to an alternative threshold value. Other configurations are contemplated.

As noted above, the one or more light modules 210 may include one or more direction light modules 340 arranged adjacent to or underneath the direction input controls 216 and disposed in communication with the controller 212. The direction input controls 216 may include the first direction input control 322 and the second direction input control 324. Here, the first direction input control 322 may be configured to select a drive direction of the motor 188 in order to ascend stairs. The second direction input control 324 may be configured to select a drive direction of the motor 188 in order to descend stairs. In some versions, the controller 212 may be configured to operate the direction light module 340 in a first illumination state ISL1, a second illumination state ISL2, and a third illumination state ISL3. The first illumination state ISL1 may be defined by the absence of light emission. The second illumination state ISL2 may be defined by oscillating light emission. The third illumination state ISL3 may be defined by steady light emission. It will be appreciated that the first, second, and third illumination states ISL1, ISL2, ISL3 of the direction light module 340 could be defined in other ways sufficient to differentiate them from each other. By way of non-limiting example, the first and second illumination states ISL1, ISL2, ISL3 could be defined by emission of light at different brightness levels (e.g., dimmed or changing between dimmed and brightened), in different colors, blinking patterns and the like. Other configurations are contemplated.

The one or more speed input controls 218 may be configured to select between the plurality of drive speeds DS1, DS2, DS3 of the motor 188. The speed indicator 332 may be disposed adjacent to the one or more speed input controls 218. The speed indicator 332 may be configured to display the selected one of the plurality of drive speeds DS1, DS2, DS3 of the motor 188 to the user. Here, the one or more light modules 210 may include the speed light module 348 disposed adjacent or underneath the speed indicator 332. The speed indicator **3*s*32 may include a plurality of bars 332A, 332B, 332C or other indicia that are illuminated by the speed light module 348 in order to communicate to the user the selected one of the plurality of drive speeds DS1, DS2, DS3 of the motor 188**.

The controller 212 may be configured to operate the speed light module 348 in a first illumination state ISS1 defined by the absence of light emission. The controller 212 may be configured to operate the speed light module 348 in a second illumination state ISS2 defined by light emission of a first bar 332A. The controller 212 may be configured to operate the speed light module 348 in a third illumination state ISS3 defined by light emission of first and second bars 332A, 332B. The controller 212 may be configured to operate the speed light module 348 in a fourth illumination state ISS4 defined by the light emission of all three bars 332A, 332B, 332C. It will be appreciated that the first, second, third, and fourth illumination states ISS1, ISS2, ISS3, and ISS4 of the light module of the speed indicator 332 could be defined in other ways sufficient to differentiate from each other. By way of non-limiting example, the first and second illumination states ISS1, ISS2 could be defined by emission of light at different brightness levels (e.g., dimmed or changing between dimmed and brightened), in different colors, blinking patterns and the like. Other configurations are contemplated.

The plurality of drive speeds DS1, DS2, DS3 may correspond to predetermined speed settings (a specific RPM setting) stored in memory of the controller 212. The plurality of drive speeds DS1, DS2, DS3 may include a first drive speed DS1, a second drive speed DS2, and a third drive speed DS3. The first drive speed DS1 corresponds to the lowest of the plurality of drive speeds DS1, DS2, DS3. The third drive speed DS3 corresponds to the highest drive speed of the plurality of drive speeds DS1, DS2, DS3. The second drive speed DS2 corresponds to a speed in between the first drive speed DS1 and the third drive speed DS3. It will be appreciated that the forgoing are non-limiting, illustrative examples of three discreet drive speeds, and other configurations are contemplated, including without limitation additional and/or fewer drive speeds, drive speeds defined in other ways, and the like.

As noted above, the one or more speed input controls 218 may include a first speed input control 326 and a second speed input control 328. The controller 212 may be configured to increase the selected speed to the next higher drive speed setting in response to the user engagement of the first speed input control 326. For example, in response to receiving user input generated by user engagement of the first speed input control 326 when the current selected drive speed is the first drive speed DS1, the controller 212 may set the current speed to the second drive speed DS2. The controller 212 may be configured to decrease the selected drive speed to the next lower drive speed setting in response to user engagement of the second speed input control 328. For example, when the current selected drive speed is the second drive speed DS2, the controller 212 may set the current speed to the first drive speed DS1 in response to user engagement of the second speed input control 328. The controller 212 may be configured to operate the speed light module 348 in one of the second, third, or fourth illumination states ISS2, ISS3, or ISS4 based on the current drive speed setting DS1, DS2, DS3 of the motor 188.

In some versions, the controller 212 may be configured to initially select the first drive speed DS1 of the plurality of drive speeds DS1, DS2, DS3 in response to user engagement of the direction input controls 216 following the change in operation from the inactive state SI to the active state SA. However, it is contemplated that the controller 212 may be configured alternatively, such as to initially select the second drive speed DS2 or the third drive speed DS3 of the plurality of drive speeds DS1, DS2, DS3.

The controller 212 may be configured to selectively permit operation of the motor 188 in response to receiving user input generated by engagement of one of the activation input controls 214 (e.g., the first activation input control 222 or the second activation input control 224). For example, the controller 212 may be configured to permit operation of the motor 188 in response to user engagement of at least one of the activation input controls 214 following user engagement of the direction input control 216 to drive the belt 156 in a selected drive direction. In another example, the controller 212 may be configured to permit operation of the motor 188 in response to user engagement of the activation input controls 214 within a predetermined period following engagement of the direction input control 216. After the predetermined period following user engagement of the direction input control 216 has elapsed, the controller 212 may prevent operation of the motor 188 even when one of the activation input controls 214 is engaged. The controller 212 may also be configured to limit operation of the motor 188 in response to receiving the user input before receiving the user input generated by user selection of one of the direction input controls 216.

The activation input controls 214 may be arranged between the first and second hand grip regions 144, 146 in order to facilitate user engagement of the activation input controls 214 from either of the first and second hand grip regions 144, 146. As previously discussed, the activation input controls 214 include the first activation input control 222 and the second activation input control 224. The first activation input control 222 may be disposed adjacent the first hand grip region 144 so as to facilitate user engagement of the first activation input control 222 from the first hand grip region 144. The second activation input control 224 may be disposed adjacent to the second hand grip region 146 so as to facilitate user engagement of the second activation input control 224 from the second hand grip region 146. Here, it will be appreciated that the user can engage either of the first and second hang grip regions 144, 146 with one of their hands to support the patient transport apparatus 100 while, at the same, using that same hand to activate one of the first and second activation input controls 222, 224 (e.g., reaching with their thumb).

The first activation input control 222 and the second activation input control 224 may be spaced apart by a predetermined distance (e.g., several inches) and are wired in parallel in some versions (not shown in detail). Here, as noted above, the one or more light modules 210 may include one or more activation light modules 342 arranged adjacent to or underneath the activation input controls 214. The controller 212 may be configured to operate the activation light module 342 in a first illumination state ISA1, a second illumination state ISA2, and a third illumination state ISA3 in order to provide visual cues to the user as to the current operating state of the patient transport apparatus 100, in particular, the current operating state of the motor 188.

The first illumination state ISA1 can be defined by an absence of light emission. The second illumination state ISA2 can be defined by light emission in a first color. The third illumination state ISA3 can be defined by light emission in a second color that is different from the first color. It will be appreciated that the first, second, and third illumination states ISA1, ISA2, ISA3 of the activation light module 342 could be defined in other ways sufficient to differentiate from each other. By way of non-limiting example, the first, second, and third illumination states ISA1, ISA2, ISA3 could be defined by emission of light at different brightness levels (e.g., dimmed or changing between dimmed and brightened), in different colors, blinking patterns and the like. Other configurations are contemplated.

In some versions, the controller 212 may operate the activation light module 342 in the second illumination state ISA2 in order to communicate to the user that the motor 188 is ready to be operated in the selected drive direction. For example, the controller 212 may switch the activation light module 342 from the first illumination state ISA2 to the second illumination state ISA2 in response to determining that the direction input control 216 has been engaged to select the drive direction of the motor 188. The controller may be configured to continue to operate the activation light module 342 in the second illumination state ISA2 when the activation input controls 214 are engaged.

In some versions, the controller 212 may be configured to operate the activation light module 342 in the third illumination state ISA3 in order to communicate to the user that one or more fault conditions associated with the patient transport apparatus 100 have been determined. For example, the controller 212 may be configured to switch from the first illumination state ISA1, to the second illumination state ISA2, and then to the third illumination state ISA3 in response to determining that one or more fault conditions associated with the patient transport apparatus 100 are present. The one or more fault conditions may be associated with any of the components of the patient transport apparatus 100, such as the motor 188, the battery 206, and the like. While several examples of control method for the user interface 204 have been discussed above, the controller 212 may employ any method of control or operation of the user interface 204 not explicitly discussed herewith but disclosed in U.S. Patent Application Publication No. 20210196539, previously incorporated by reference.

Figure 15:
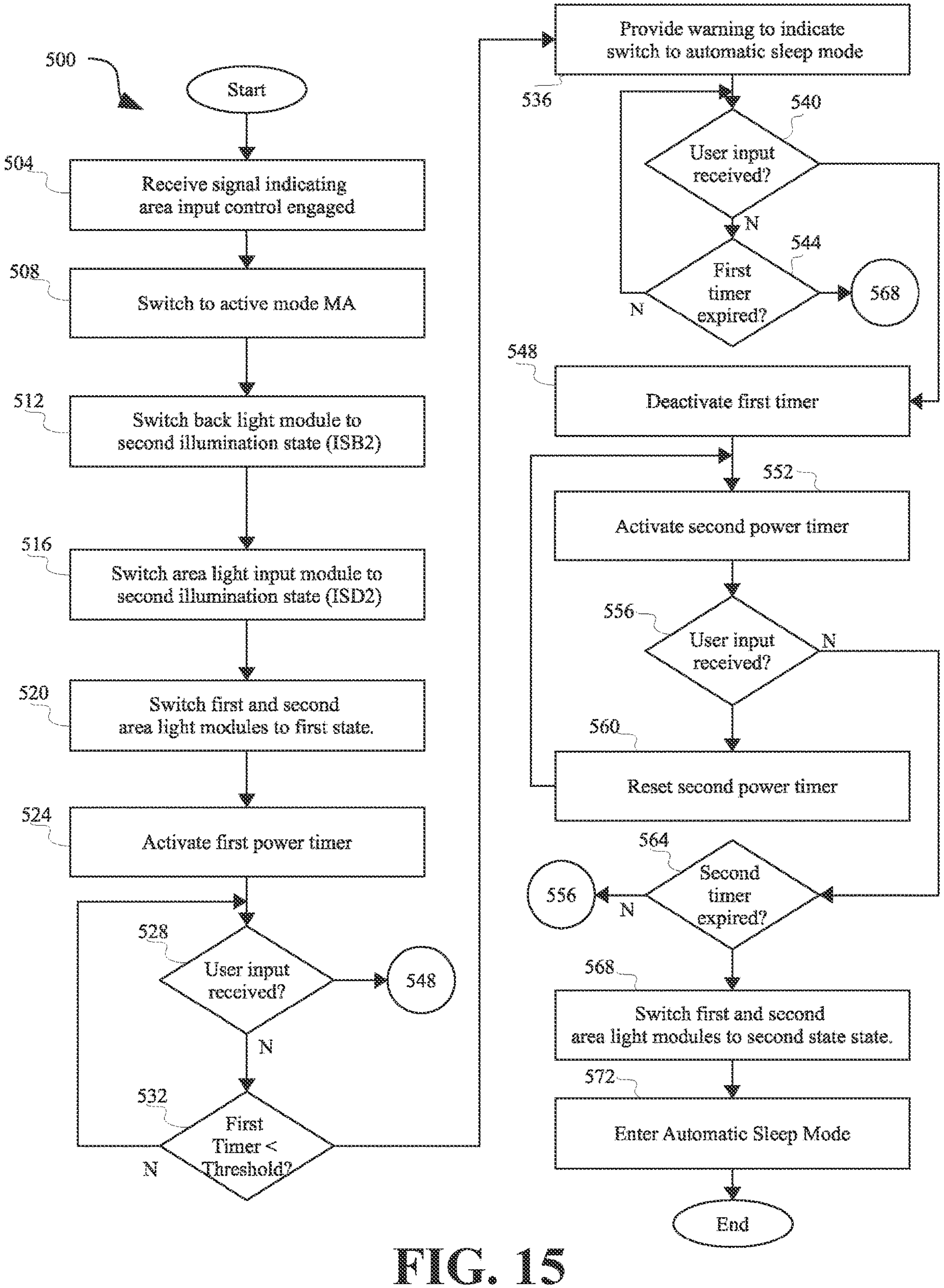
FIG. 15 is a method sequence depicting light modules operated by the controller in response to user engagement of an area light input control of the user interface while in sleep mode according to the teachings of the present disclosure.

With reference to FIG. 15, an exemplary method sequence 500 which may be performed by the controller 212 under certain use conditions of the patient transport apparatus 100 is depicted. As will be appreciated from the subsequent description below, this method sequence 500 merely represents an exemplary and non-limiting sequence of blocks to describe operation of certain light modules 210 in response to user engagement with the user interface 204 during the sleep mode MS of the inactive state SI and the active mode MA of the inactive state SI. The method sequence 500 is in no way intended to serve as a complete functional block diagram of the control system 202.

The exemplary method sequence 500 begins with the controller 212 operating in the sleep mode MS of the inactive state SI. At 504, the controller receives a signal indicating that the user has engaged the area light input control 334. At 508, the controller 212 switches to active mode MA of the inactive state SI. At block 512, the controller 212 switches the back light module 338 to the second illumination state (ISB2). At block, 516, the controller 212 switches the area light input module 344 to the second illumination state (ISD2). At 520, the controller 212 switches the first and second area light modules 335, 336 to the first state so that the first and second area light modules 335, 336 are illuminating the surrounding area of the patient transport apparatus 100. At block 524, the controller 212 activates the first power timer. At block 528, the controller 212 determines whether user input has been received. If yes, the controller 212 continues to block 548; otherwise, the controller 212 continues to block 532 At block 528, the controller 212 determines whether a current time of the first power timer is less than a threshold time. If so, the controller 212 continues to 536; otherwise, the controller 212 continues back at 528.

At 536, the controller 212 provides a warning, for example by switching the first and second area light modules 335, 336 to the third state briefly before switching the first and second area light modules 335, 336 back to the first state, to indicate to the user the impending switch to automatic sleep mode absent user engagement of the user interface 204. At block 540, the controller 212 determines whether user input was received. If so, the controller 212 continues to block 548; otherwise, the controller 212 continues to block 544. At block 544, the controller 212 determines whether the first power timer has expired. If so, the controller 212 continues to block 572; otherwise, the controller 212 continues back at 540. At block 548, the controller 212 deactivates the first power timer. At block 552, the controller 212 activates the second power time. At block 556, the controller determines whether user input has been received. If so, the controller 212 continues to block 560; otherwise, the controller 212 continues to block 564. At block 560, the controller 212 resets the second power timer. At block 564, the controller 212 determines whether the second power timer has expired. If so, the controller 212 continues to 568; otherwise, the controller 212 continues back at 556. At block 568, the controller 212 switches the first and second area light modules 335, 336 to the second state (i.e., powered off). At block 572, the controller enters automatic sleep mode and the method sequence 500 may end. While the exemplary method sequence 500 is shown as "starting" and "ending" in FIG. 15, for illustrative purposes, it will be appreciated that the controller 212 may instead return to block 504. Furthermore, as noted above, the exemplary method sequence 500 described above and depicted in FIG. 15 is in no way intended to serve as a complete functional block diagram of the control system 202, and other configurations are contemplated.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus operable by a user for transporting a patient along stairs, the patient transport apparatus comprising:

a support structure;

a seat section and a back section coupled to the support structure for supporting the patient;

a track assembly extending from the support structure and having a belt for traversing stairs;

a motor coupled to the track assembly to selectively generate torque to drive the belt;

an upper area light module coupled to the back section and configured to illuminate light directed at floor surfaces in a rearward direction and constrained to a rearward volume adjacent to the patient transport apparatus to prevent the light from obstructing a view of a user engaging a pivoting handle assembly;

a user interface arranged for engagement by the user and including an activation input control for operating the motor to drive the belt, and an area light input control for controlling operation of the upper area light module;

the pivoting handle assembly including first and second hand grip regions arranged to be grasped by the user during movement of the patient transport apparatus; and a controller in communication with the motor, the user interface, and the upper area light module, the controller being configured to permit operation of the motor in response to user engagement of the activation input control and to operate the upper area light module in at least one of a first state and a second state based on user engagement of the area light input control, wherein the first state is defined by emission of light from the upper area light module and the second state is defined by an absence of light emission from the upper area light module.

II. The patient transport apparatus of clause I, wherein the rearward volume is defined in part by an upper shield, the upper shield of the rearward volume being substantially parallel to a surface of the seat section.

III. The patient transport apparatus of clause II, wherein further comprising a first pivot handle assembly and a second pivot handle assembly, each arranged to be grasped by the user during movement of the patient transport apparatus, wherein the upper shield is also substantially parallel to the first pivot handle assembly and the second pivot handle assembly.

IV. The patient transport apparatus of any of clauses II-III, wherein the upper area light module is further defined as a first area light module and is coupled to a first portion of the back section; and wherein the patient transport apparatus further comprises a second area light module coupled to a second portion of the back section.

V. The patient transport apparatus of clause IV, wherein the first area light module includes a first housing defining a first emission window to emit a first light through the first emission window toward floor surfaces, and the second area light module includes a second housing defining a second emission window to emit a second light through the second emission window toward floor surfaces.

VI. The patient transport apparatus of clause V, wherein the first emission window has a first upper emission surface and the second emission window has a second upper emission surface, the first upper emission surface and the second upper emission surface defining the upper shield of the rearward volume.

VII. The patient transport apparatus of any of clauses IV-VI, wherein the first area light module and the second area light module each include respective reflectors arranged to direct light toward floor surfaces.

VIII. The patient transport apparatus of any of clauses IV-VII, wherein the patient transport apparatus is operable between a stowed configuration and a chair configuration.

IX. The patient transport apparatus of any of clauses I-VIII, wherein the activation input control is further defined as a first activation input control, the patient transport apparatus further comprising a second activation input control, the first activation input control and the second activation input control, each arranged to be engaged by the user in order to move the patient transport apparatus up and down the stairs.

X. The patient transport apparatus of any of clauses I-IX, wherein the support structure includes a front handle assembly coupled to the support structure, the front handle assembly including a first hand grip region and a second hand grip region, each arranged to be grasped by another user during movement of the patient transport apparatus.

XI. The patient transport apparatus of clause X, wherein the patient transport apparatus further comprises a carrier assembly coupled to the support structure and the track assembly and being arranged for movement relative to the support structure between:

a chair configuration in which the patient transport apparatus is configured to move along floor surfaces, and a stair configuration in which the patient transport apparatus is configured to ascend or descend stairs.

XII. The patient transport apparatus of clause XI, wherein the carrier assembly includes a cover, at least one shaft defining a wheel axis, a first rear wheel and a second rear wheel supported for rotation about the wheel axis.

XIII. The patient transport apparatus of clause XII, wherein the patient transport apparatus further comprises a lower area light module coupled to the carrier assembly and configured to illuminate light directed at floor surfaces in a forward direction and constrained to a forward volume adjacent to the patient transport apparatus to prevent the light from obstructing a view of a user engaging the front handle assembly while ascending or descending the stairs with the patient transport apparatus.

XIV. The patient transport apparatus of clause XIII, wherein the upper area light module and the lower area light module are configured to operate independent of each other.

XV. The patient transport apparatus of any of clauses XIII-XIV, wherein the forward volume is bound in part by a lower shield extending away from the front handle assembly.

XVI. The patient transport apparatus of clause XV, wherein the cover includes an aperture and the lower area light module is disposed within the carrier assembly and coupled to an inner surface of the cover and at least partially exposed by the aperture, the cover being shaped to limit light propagation from the lower area light module.

XVII. The patient transport apparatus of clause XVI, wherein the cover is shaped to form a visor that extends over a portion of the aperture, the visor directing the light to below the lower shield of the forward volume.

XVIII. The patient transport apparatus of any of clauses I-XVII, wherein the user interface further comprises a direction input control for selecting a drive direction of the motor.

XIX. The patient transport apparatus of any of clauses I-XVIII, wherein the controller is operable between:

a sleep mode to limit power consumption; and an active mode to facilitate operation of at least one of the motor and the upper area light module.

XX. The patient transport apparatus of clause XIX, wherein:

in response to switching from the sleep mode to active mode, the controller is configured to monitor time elapsed following user engagement of the user interface;

in response to user engagement of the user interface prior to a first period of time elapsing following the controller switching from sleep mode to active mode, the controller is configured to remain in active mode for a second period of time, the second period of time being longer than the first period of time; and the controller is configured to provide a warning prior to the first period of time elapsing to notify the user that sleep mode is soon to be activated.

XXI. The patient transport apparatus of clause XX, wherein the warning is at least one of an audible warning, a visual warning, and a haptic warning.

XXII. A patient transport apparatus operable by a user for transporting a patient along stairs, the patient transport apparatus comprising:

a support structure;

a seat section and a back section coupled to the support structure for supporting the patient;

a track assembly extending from the support structure and having a belt for traversing stairs;

a motor coupled to the track assembly to selectively generate torque to drive the belt;

an area light module including a light, the area light module operable between a first state and a second state different from the first state;

a user interface arranged for engagement by the user and including an activation input control for operating the motor to drive the belt, and an area light input control for controlling operation of the area light module; and a controller in communication with the motor, the user interface, and the area light module, the controller being configured to:

permit operation of the motor in response to user engagement of the activation input control;

operate the area light module in at least one of the first state and the second state based on user engagement of the area light input control;

operate between a sleep mode to limit power consumption, and an active mode to facilitate operation of at least one of the motor and the area light module; and simultaneously change operation from the sleep mode to the active mode and operate the area light module in the first state in response to user engagement of the area light input control.

XXIII. The patient transport apparatus of clause XXII, wherein the controller is further configured to:

activate a first sleep timer in response to user engagement of the area light input control; and provide a warning to the user to indicate that the first sleep timer is within a threshold of elapsing.

XXIV. The patient transport apparatus of clause XXIII, wherein the controller is configured to switch from active mode to sleep mode in response to the absence of user engagement of the user interface and the first sleep timer elapsing.

XXV. The patient transport apparatus of any of clauses XXIII-XXIV, wherein the controller is configured to, in response to user engagement of the user interface prior to the first sleep timer elapsing, (i) deactivate the first sleep timer and (ii) activate a second sleep timer, the second sleep timer having a longer duration of time than the first sleep timer.

XXVI. The patient transport apparatus of any of clauses XXIII-XXV, wherein area light module is operable in a third state; and wherein the warning is provided by operating the area light module in the third state.

XXVII. The patient transport apparatus of any of clauses XXIII-XXVI, wherein the warning is at least one of an audible alert, a visual alert, and a haptic alert.

XXVIII. The patient transport apparatus of any of clauses XXII-XXVII, wherein, in response to switching from sleep mode to active mode, the controller is configured to monitor time elapsed following user engagement of the user interface.

XXIX. The patient transport apparatus of any of clauses XXII-XXVIII, wherein, in response to user engagement of the user interface prior to a first period of time elapsing, the controller is configured to remain in active mode for a second period of time, the second period of time being longer than the first period of time.

XXX. The patient transport apparatus of clause XXIX, wherein the controller is configured to generate a warning signal prior to the first period of time elapsing to notify the user that sleep mode will be activated absent user engagement with the user interface within a third period of time.

XXXI. The patient transport apparatus of any of clauses XXII-XXX, wherein in the first state, the area light module illuminates light surrounding the patient transport apparatus and in the second state, the area light module does not illuminate light.

What is claimed is:

1. A patient transport apparatus operable by a user for transporting a patient along stairs, the patient transport apparatus comprising:
- a support structure;
- a seat section and a back section coupled to the support structure for supporting the patient;
- a track assembly extending from the support structure and having a belt for traversing stairs;
- a motor coupled to the track assembly to selectively generate torque to drive the belt;
- an upper area light module coupled to the back section and configured to illuminate light directed at floor surfaces in a rearward direction and constrained to a rearward volume adjacent to the patient transport apparatus by a shield at least partially defining the rearward volume to prevent the light from obstructing a view of a user engaging a pivoting handle assembly;
- a user interface arranged for engagement by the user and including an activation input control for operating the motor to drive the belt, and an area light input control for controlling operation of the upper area light module;
- the pivoting handle assembly including first and second hand grip regions arranged to be grasped by the user during movement of the patient transport apparatus; and
- a controller in communication with the motor, the user interface, and the upper area light module, the controller being configured to permit operation of the motor in response to user engagement of the activation input control and to operate the upper area light module in at least one of a first state and a second state based on user engagement of the area light input control, wherein the first state is defined by emission of light from the upper area light module and the second state is defined by an absence of light emission from the upper area light module.

2. The patient transport apparatus of claim 1, wherein the shield is further defined as an upper shield, with the upper shield of the rearward volume being substantially parallel to a surface of the seat section.

3. The patient transport apparatus of claim 2, further comprising a first pivot handle assembly and a second pivot handle assembly, each arranged to be grasped by the user during movement of the patient transport apparatus, wherein the upper shield is also substantially parallel to the first pivot handle assembly and the second pivot handle assembly.

4. The patient transport apparatus of claim 2, wherein the upper area light module is further defined as a first area light module and is coupled to a first portion of the back section; and
- wherein the patient transport apparatus further comprises a second area light module coupled to a second portion of the back section.

5. The patient transport apparatus of claim 4, wherein the first area light module includes a first housing defining a first emission window to emit a first light through the first emission window toward floor surfaces, and the second area light module includes a second housing defining a second emission window to emit a second light through the second emission window toward floor surfaces.

6. The patient transport apparatus of claim 5, wherein the first emission window has a first upper emission surface and the second emission window has a second upper emission surface, the first upper emission surface and the second upper emission surface defining the upper shield of the rearward volume.

7. The patient transport apparatus of claim 4, wherein the first area light module and the second area light module each include respective reflectors arranged to direct light toward floor surfaces.

8. The patient transport apparatus of claim 4, wherein the patient transport apparatus is operable between a stowed configuration and a chair configuration.

9. The patient transport apparatus of claim 1, wherein the activation input control is further defined as a first activation input control, the patient transport apparatus further comprising a second activation input control, the first activation input control and the second activation input control, each arranged to be engaged by the user in order to move the patient transport apparatus up and down the stairs.

10. The patient transport apparatus of claim 1, wherein the support structure includes a front handle assembly coupled to the support structure, the front handle assembly including a first hand grip region and a second hand grip region, each arranged to be grasped by another user during movement of the patient transport apparatus.

11. The patient transport apparatus of claim 10, wherein the patient transport apparatus further comprises a carrier assembly coupled to the support structure and the track assembly and being arranged for movement relative to the support structure between:
- a chair configuration in which the patient transport apparatus is configured to move along floor surfaces, and
- a stair configuration in which the patient transport apparatus is configured to ascend or descend stairs.

12. The patient transport apparatus of claim 11, wherein the carrier assembly includes a cover, at least one shaft defining a wheel axis, a first rear wheel and a second rear wheel supported for rotation about the wheel axis.

13. The patient transport apparatus of claim 12, wherein the patient transport apparatus further comprises a lower area light module coupled to the carrier assembly and configured to illuminate light directed at floor surfaces in a forward direction and constrained to a forward volume adjacent to the patient transport apparatus to prevent the light from obstructing a view of a user engaging the front handle assembly while ascending or descending the stairs with the patient transport apparatus.

14. The patient transport apparatus of claim 13, wherein the upper area light module and the lower area light module are configured to operate independent of each other.

15. The patient transport apparatus of claim 13, wherein the forward volume is bound in part by a lower shield extending away from the front handle assembly.

16. The patient transport apparatus of claim 15, wherein the cover includes an aperture and the lower area light module is disposed within the carrier assembly and coupled to an inner surface of the cover and at least partially exposed by the aperture, the cover being shaped to limit light propagation from the lower area light module.

17. The patient transport apparatus of claim 16, wherein the cover is shaped to form a visor that extends over a portion of the aperture, the visor directing the light to below the lower shield of the forward volume.

18. The patient transport apparatus of claim 1, wherein the user interface further comprises a direction input control for selecting a drive direction of the motor.

19. The patient transport apparatus of claim 1, wherein the controller is operable between:

a sleep mode to limit power consumption; and an active mode to facilitate operation of at least one of the motor and the upper area light module.

20. The patient transport apparatus of claim 19, wherein:

in response to switching from the sleep mode to active mode, the controller is configured to monitor time elapsed following user engagement of the user interface;

in response to user engagement of the user interface prior to a first period of time elapsing following the controller switching from sleep mode to active mode, the controller is configured to remain in active mode for a second period of time, the second period of time being longer than the first period of time; and the controller is configured to provide a warning prior to the first period of time elapsing to notify the user that sleep mode is soon to be activated.

* * * * *